US012812202B2

(12) United States Patent
White et al.

(10) Patent No.: US 12,812,202 B2
(45) Date of Patent: Nov. 24, 2026

(54) LIVE WORKOUT

(71) Applicant: Tonal Systems, Inc., San Francisco, CA (US)

(72) Inventors: Scott Matthew White, San Francisco, CA (US); Gert Petja, San Francisco, CA (US); Michael Philip Hand, San Francisco, CA (US); Marisa Abril, San Francisco, CA (US); Denis Bezrukov, Samara (RU)

(73) Assignee: Tonal Systems, Inc., San Francisco, CA (US)

( * ) Notice: Subject to any disclaimer, the term of this patent is extended or adjusted under 35 U.S.C. 154(b) by 0 days.

(21) Appl. No.: 18/775,870

(22) Filed: Jul. 17, 2024

(65) Prior Publication Data

US 2025/0016395 A1 Jan. 9, 2025

Related U.S. Application Data

(63) Continuation of application No. 17/968,198, filed on Oct. 18, 2022, now Pat. No. 12,075,110.
(Continued)

(51) Int. Cl.
*H04N 21/43* (2011.01)
*A63B 24/00* (2006.01)
(Continued)

(52) U.S. Cl.
CPC ..... *H04N 21/4305* (2013.01); *A63B 24/0062* (2013.01); *A63B 71/0622* (2013.01);
(Continued)

(58) Field of Classification Search
CPC ........... H04N 21/4305; H04N 21/2187; H04N 21/235; H04N 21/414; H04N 21/8173;
(Continued)

(56) References Cited

U.S. PATENT DOCUMENTS 10,022,590 B2 7/2018 Foley
10,322,315 B2 6/2019 Foley
(Continued)

FOREIGN PATENT DOCUMENTS

WO WO-2021011563 A1 * 1/2021 ........... A63B 22/025

OTHER PUBLICATIONS

Sofia Golovnya, "Internet of Things for Fitness Tracking: How to Implement Devices for Your Smart Gym", published Oct. 20, 2020, found on web.archive.org Nov. 1, 2020 riseapps.co (Year: 2020).*
(Continued)

*Primary Examiner* — Nicholas T Corbo
(74) *Attorney, Agent, or Firm* — Van Pelt, Yi & James LLP

(57) ABSTRACT

In response to an indication of a transition in a live workout, a synchronization identifier as metadata is embedded in a portion of a video stream of the live workout. The portion of the video stream of the live workout is transmitted to a remote client exercise machine. A hardware state of the remote client exercise machine is updated based at least in part on the synchronization identifier, at least in part to synchronize the remote client exercise machine with the live workout.

In response to an exercise machine joining a video stream of a live workout, a timeline comprising a set of events that are to occur over the course of the live workout is received. A portion of the video stream of the live workout is received, wherein the portion of the video stream has embedded a synchronization identifier. The portion of the video stream is rendered. A hardware state of the exercise machine is updated at least in part by evaluating the timeline using the synchronization identifier embedded in the portion of the video stream, at least in part to synchronize the exercise machine with the live workout.
(Continued)

An occurrence of a workout event with respect to one or more participants of a live workout is received. A prioritization of the event is determined based at least in part on at least one of a recency of the event or a categorization of the event. The event and the corresponding prioritization to a client exercise machine is transmitted, wherein a position of a presentation of the event on a feed of events on the client exercise machine is based at least in part on the prioritization of the event.

15 Claims, 24 Drawing Sheets

Related U.S. Application Data

(60) Provisional application No. 63/257,237, filed on Oct. 19, 2021.

(51) Int. Cl.

| | |
|---|---|
| ***A63B 71/06*** | (2006.01) |
| ***H04N 21/2187*** | (2011.01) |
| ***H04N 21/235*** | (2011.01) |
| ***H04N 21/414*** | (2011.01) |
| ***H04N 21/81*** | (2011.01) |

(52) U.S. Cl.
CPC ....... *H04N 21/2187* (2013.01); *H04N 21/235* (2013.01); *H04N 21/414* (2013.01); *H04N 21/8173* (2013.01); *A63B 2024/0081* (2013.01); *A63B 2225/20* (2013.01)

(58) Field of Classification Search
CPC ............ A63B 24/0062; A63B 71/0622; A63B 21/0058; A63B 21/0065; A63B 21/0076
See application file for complete search history.

(56) References Cited

U.S. PATENT DOCUMENTS

| | | | | |
|---|---|---|---|---|
| 10,864,406 | B2 | 12/2020 | Foley | |
| 11,170,886 | B2 | 11/2021 | Foley | |
| 2013/0083009 | A1 | 4/2013 | Geisner | |
| 2014/0038777 | A1* | 2/2014 | Bird ................. | A63B 23/03525 482/5 |
| 2018/0126248 | A1 | 5/2018 | Dion | |
| 2020/0070032 | A1* | 3/2020 | Orady ....................... | H02P 3/22 |
| 2020/0406119 | A1 | 12/2020 | Woltermann | |

OTHER PUBLICATIONS

The Fireside App. Jan. 26, 2022. https://web.archive.org/web/20220126133729/https://thefiresideapp.com/.

* cited by examiner

LIVE WORKOUT

CROSS REFERENCE TO OTHER APPLICATIONS

This application is a continuation of U.S. patent application Ser. No. 17/968,198, entitled LIVE WORKOUT filed Oct. 18, 2022 which is incorporated herein by reference for all purposes, which claims priority to U.S. Provisional Application No. 63/257,237, entitled LIVE WORKOUT filed Oct. 19, 2021 which is incorporated herein by reference for all purposes.

BACKGROUND OF THE INVENTION

Effective strength training programs that may include an exercise machine include those where a user engages in a scheduled program at a gymnasium or fitness club under the tutelage of a coach and/or with a group of colleagues. The group may provide instruction, improvement, and/or encouragement. When providing instruction, improvement, and/or encouragement for users of strength training exercise machines at their home without a group in their home, the engagement of a user with their remote group is enhanced with social encouragement by a workout that appears to be conducted by a coach "live" and/or in real-time, similar to that at the gymnasium or fitness club.

BRIEF DESCRIPTION OF THE DRA WINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Live remote group workouts for set-based exercise are disclosed. Unlike some aerobic training like cycling or rowing, strength training is an example of a set-based exercise that has discrete sets of exercise to be synchronized to keep a group workout together, between live coach and a plurality of users exercising.

Facilitating a livestreamed group workout allowing multiple strength training machine users to synchronously perform a same workout in real-time across a network is disclosed. Social interaction during the livestreamed group workout is disclosed, including live coach callouts to particular user(s), information about the progress of individual participants may be included, and/or group progression may be delayed to keep participants at approximately the same set of the workout.

Figure 1:
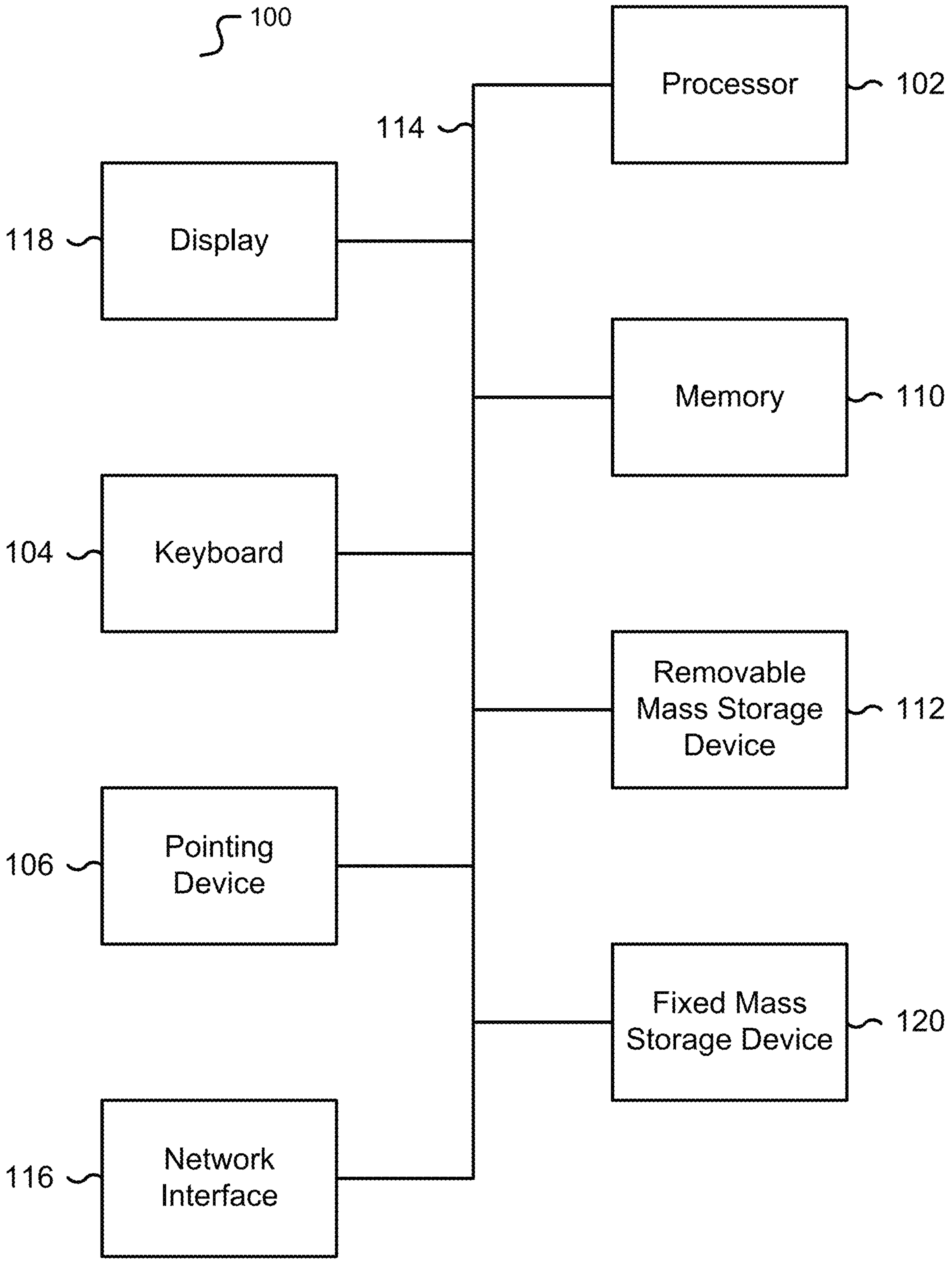
FIG. 1 is a functional diagram illustrating a programmed computer/server system for remote group workouts for an exercise machine in accordance with some embodiments.

FIG. 1 is a functional diagram illustrating a programmed computer/server system for live workouts for an exercise machine in accordance with some embodiments. As shown, FIG. 1 provides a functional diagram of a general purpose computer system programmed to provide live workouts for an exercise machine in accordance with some embodiments. As will be apparent, other computer system architectures and configurations may be used for timeline and/or media control for an exercise machine.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as is well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storages (112), (120) generally store additional programming instructions, data, and the like that typically are not in active use by the processor (102). It will be appreciated that the information retained within mass storages (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification, "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Figure 2A:
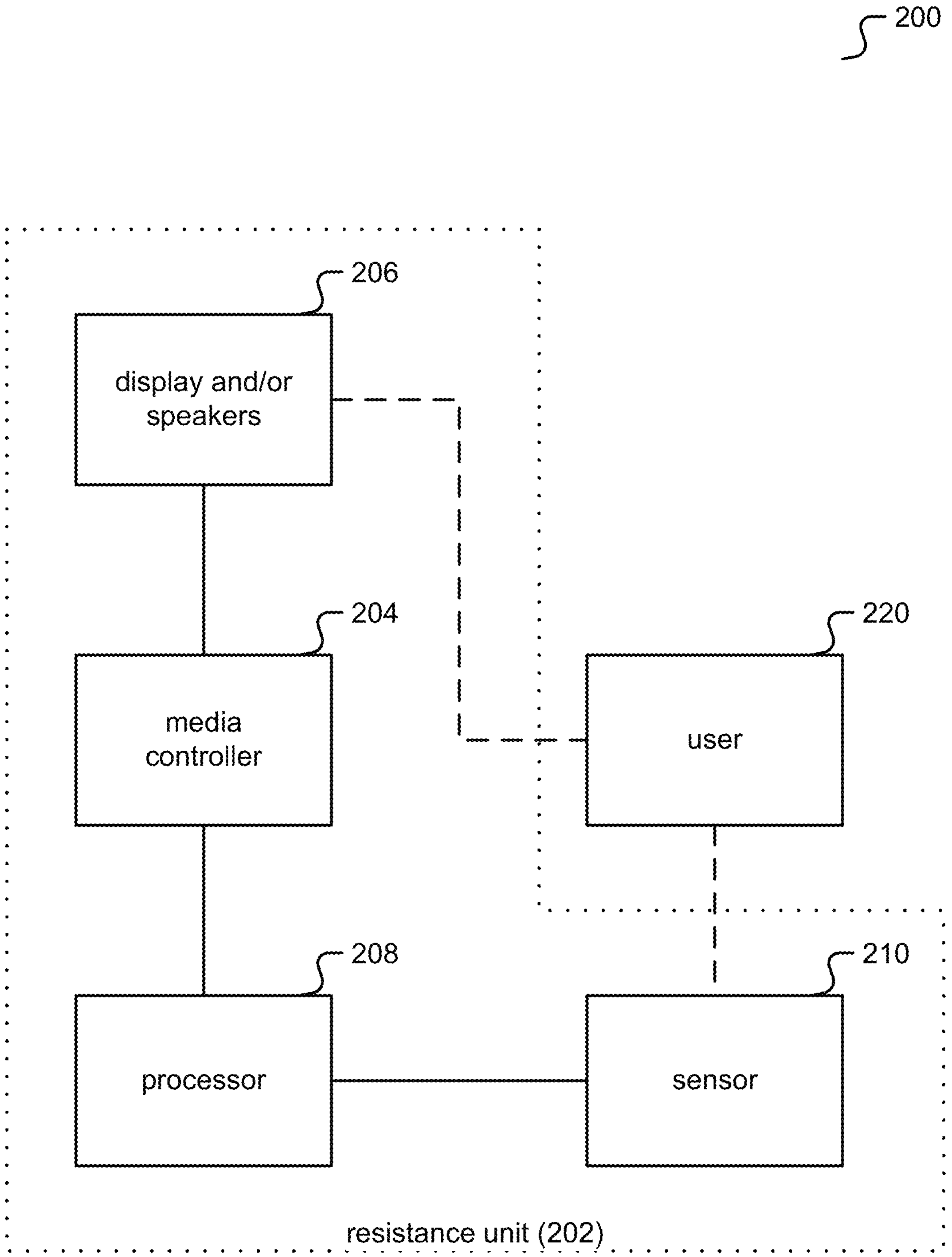
FIG. 2A is a block diagram illustrating an embodiment of a strength training machine.

FIG. 2A is a block diagram illustrating an embodiment of a strength training machine. In one embodiment (200), within the exercise machine (202) itself that provides resistance to motion against which the user (220) exercises, the system includes: a media controller (204) including a memory which comprises exercise machine control information and storage comprising video, audio, and text or icon content as well as sequencing instructions; a display/speakers (206) needed to present media to the user; a central processor (208); and a sensor (210) to provide user context. With this system, user performance may be tracked throughout the exercise period and user data accumulated and stored.

Sensor (210) as referred to herein includes: a power switch, a database query result, a clock, a calendar, a touch screen, a button or touch-based control interface, a remote button or touch-based controller, a camera, a microphone, a depth sensing camera, a seat sensor, a push force sensor for a user foot, a pull force sensor for a user foot, a seat to rail position sensor, a handle position sensor, a handle orientation sensor, a handle button(s), a cable position, speed, acceleration sensor, a cable tension sensor, a torque sensor, a current sensor(s), a voltage sensor(s), a wearable sensor such as a watch or belt to pick up on biometrics such as a heart rate sensor, pulse-ox, respiration, position, etc.

This data may be analyzed and compared with other available information which allows user exercise to be compared and optimized for better results. Workouts comprising sets of repetitions (or "reps") may be planned and then analyzed on the fly as a user proceeds. A user's progress may provide user context and media may be dynamically altered to modify a simulated coaching to best encourage or improve a user.

Context as referred to herein includes: personalized identifier, user name, user age, user sex, user height, user weight, user health history, user workout history, user heart rate, user respiration rate, user VO2 max, user oxygen saturation, user body temperature, user activity tracking, user fitness tracking, user sleep tracking, user mood, user coaching style preference, user preferences, environmental temperature, environmental humidity, location, altitude, workout, movement, set number, rep number, user performance for current and historical/past reps, user plan for future reps, historical/past and current coaching content, exercise machine physical configuration, exercise machine status, and/or whether the exercise machine is in an emergency stop.

In one embodiment, the exercise appliance (202) passes a load/resistance against the user via one or more lines/cables, to a grip(s) that a user displaces to exercise. A grip may be positioned relative to the user using a load arm and the load path to the user may be steered using pulleys at the load arm ends. The load arm may be connected to the exercise appliance frame using a carriage that moves within a track that may be affixed to the main part of the frame. In one embodiment, the frame is firmly attached to a rigid structure such as a wall.

In one embodiment, the appliance (202) includes a controller (204) and/or processor (208) which monitors/measures user performance, for example, using one or more sensors (210), and determines loads to be applied to the user's efforts in the resistance unit (202). Without limitation, the media controller (204) and processor (208) may be separate control units or combined in a single package. The controller (204) is further coupled to a display/acoustic channel (206) that allows instructional information to be presented to a user (220) and with which the user (220) interacts in a visual manner, referred to herein as any method of communication based on the eye such as video and/or text or icons, and/or an auditory manner, referred to herein as any method of communication based on the car and/or mouth such as verbal speech, text-to-speech synthesis, and/or music. Collocated with an information channel is a data channel that passes control program information to the processor (208) which then generates the exercise loading schedules. The display (206) may be incorporated into the exercise machine. In one embodiment, the display (206) is a large format, surround screen representing a virtual reality/alternate reality environment to the user; a virtual reality and/or alternate reality presentation may also be made using a headset (206).

In one embodiment, the appliance controller (204) provides audio information that is related to the visual information from a program store/repository that may be coupled to external devices or transducers (206) to provide the user with an auditory experience that matches the visual experience. Control instructions that set the operational parameters of the resistance unit (202) for controlling the load or resistance for the user may be embedded with the user information so that the media package includes everything needed for the controller to run the machine. In this way a user (220) may choose an exercise regime and may be provided with cues, visual and auditory as appropriate, that allow the actions of a personal trainer to be emulated. The controller may further emulate the actions of a trainer using an expert system and thus exhibit artificial intelligence. The user may better form a relationship with the emulated coach or trainer, and this relationship may be encouraged by using emotional/mood cues whose effect may be quantified based on performance metrics gleaned from exercise records that track user performance in a feedback loop using, for example, the sensor(s) (210).

The appliance controller may also be coupled to the environmental control for the exercise area so that exercise parameters may be optimized, adjusting lighting, temperature, and humidity as appropriate based on telemetry such as home automation telemetry via an API (application programing interface), and/or sensors (210). The controller (204) and/or processor (208) may also be responsive to the environmental conditions prevailing so that the exercise routines may be moderated to stay within reasonable performance expectations; for example, if the humidity is high, a lower rate of working may be requested from the appliance either under automatic control by the controller logic, or at the user's request. The appliance (202) may be entirely self-contained and/or connected to a data service that allows the appliance's exercise program or programs and operational parameters to be changed.

The appliance controller (204) determines and schedules not only the operation of the exercise appliance, but also the actions of one or more coaches who appear to the user (220). The coach may be a virtual coach, an abstraction such as an animation or other drawn art coach, and/or a live coach. The load or resistance applied, against which a user exercises, is determined by the processor (208) and may be provided by one or more actuators, such as an electric motor which facilitates a wide range of exercise parameters. Sensor(s) (210) measure user action and this information may be processed by the controller (204) and processor (208) to be used interactively with exercise parameters.

As an improvement over traditional techniques with static visual/auditory run on an exercise machine, such an appliance (202) may personalize coaching for a user (220) and/or otherwise improve encouragement for the user (220) to continue with an exercise regime provided by the exercise machine, which is physically beneficial to the user and/or may be otherwise less boring. Because the controller is able to determine the user status at any time during exercise, exercise conditions may be adapted dynamically and the actions of the trainer/coach may be adjusted in near-real time to reflect changes, which improves user encouragement and/or trust in the exercise machine.

The user may also be able to influence the exercise routine directly by requesting a change. This process may be a dynamic process and not statically predetermined prior to beginning the exercise routine. For example, the exercise tempo may be altered, the number of repetitions may be adjusted, the workload may be altered, and the user may request these changes at any time prior to the end of the exercise segment where an exercise terminates. The exercise machine may dynamically adjust the media content to reflect user requests in a manner that avoids significant discontinuity/interruption, gracefully simulating the actions of a coach including requests, such as asking the user if they wish to extend or alter the exercise segment or routine.

Figure 2B:
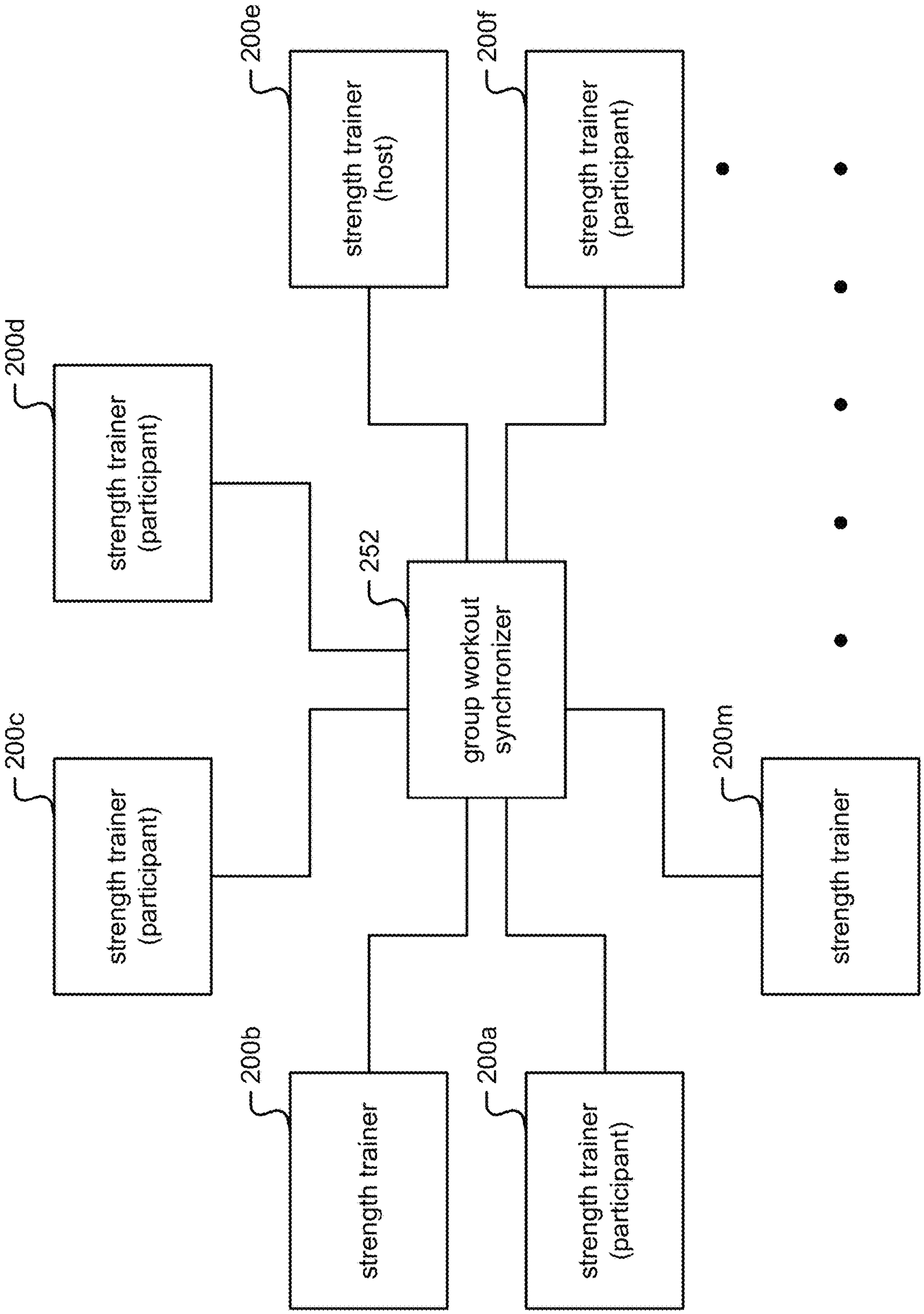
FIG. 2B is a block diagram illustrating an embodiment of a system for group workouts.

Hosted Group Workouts. FIG. 2B is a block diagram illustrating an embodiment of a system for group workouts. In one embodiment, the strength trainers shown in FIG. 2B are the embodiments (200) in FIG. 2A each for a different user.

A plurality of strength trainers (200*a*), (200*b*), . . . , (200*m*) are shown coupled via a network to a group workout synchronizer (252), which may be a server as described in FIG. 1 at least in part comprising a processor (102) and network interface (116), or a part of a server, or a plurality of servers.

As shown in FIG. 2B, a strength trainer (200*e*) is designated as a host to lead a group workout, without necessarily requiring a coach and/or live coach. In one embodiment, the indication includes a code that other strength trainers/users may use to join, for example as shown in FIG. 2B with (200*a*), (200*c*), (200*d*), (200*f*), or not for example as shown in FIG. 2B with (200*b*), (200*m*). In one embodiment, the group workout synchronizer (252) provides the technical facility for assembling the group and/or provides the social facility for in-band or out-of-band chat such as text messages, auditory messages, and/or visual messages.

Figure 3:
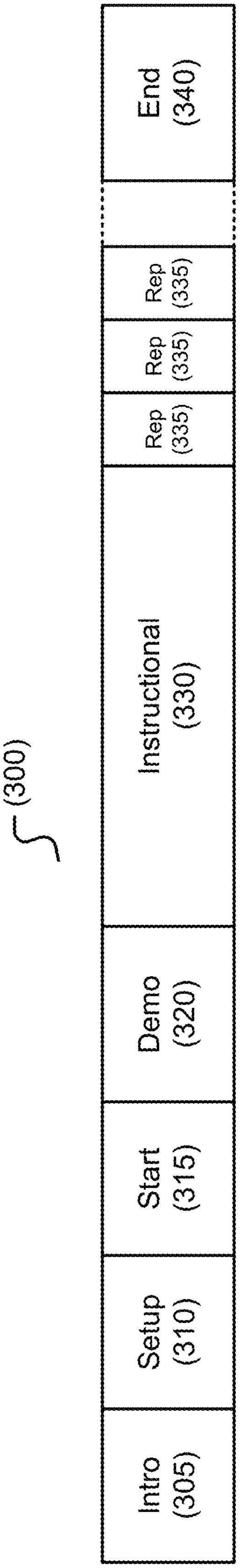
FIG. 3 is a diagram illustrating an example of an exercise sequence in an embodiment of a system for controlling a workout.

In one embodiment, synchronization includes the use of exercise sequences and/or timelines. FIG. 3 is a diagram illustrating an example of an exercise sequence in an embodiment of a system for controlling a workout, for example that shown in FIG. 2B.

The exercise sequence (300) in FIG. 3 is displayed as event sequences in time starting at the left of FIG. 3. In this example, the sequence (300) is divided into events. Each event is represented in FIG. 3 by a duration in the horizontal axis and lies adjacent to its prior and subsequent events. Without limitation, no relative scale is implied by the illustration of FIG. 3.

The first event (305) may be an introduction with a welcome message along with some guidance about how to interact with the system in FIG. 2A. There may be visual and/or auditory content, and/or operational programming for the system. The next event (310) may be an initialization or setup routine; in this case, unless there are user directions, visual/auditory content may be absent. If there are user directions, such as swapping grips to the system, then the appropriate guidance content may be offered.

The next event (315) may start a workout. This may be a simple start up that starts the resistance load against the user and may be of short duration. The next event (320) may be a visual demonstration shown to the user coupled with auditory content before an instructional event (330) is started. Typically this instructional element (330) is interactive, with the user performing exercise at the system alongside the system visual and auditory content. Once an instructional element (330) is complete, then a user encounters a series of repetition elements (335) which are initially predefined based on the user's level of performance. The conclusion of the last repetition element leads to the end of the workout (340).

Figure 4A:
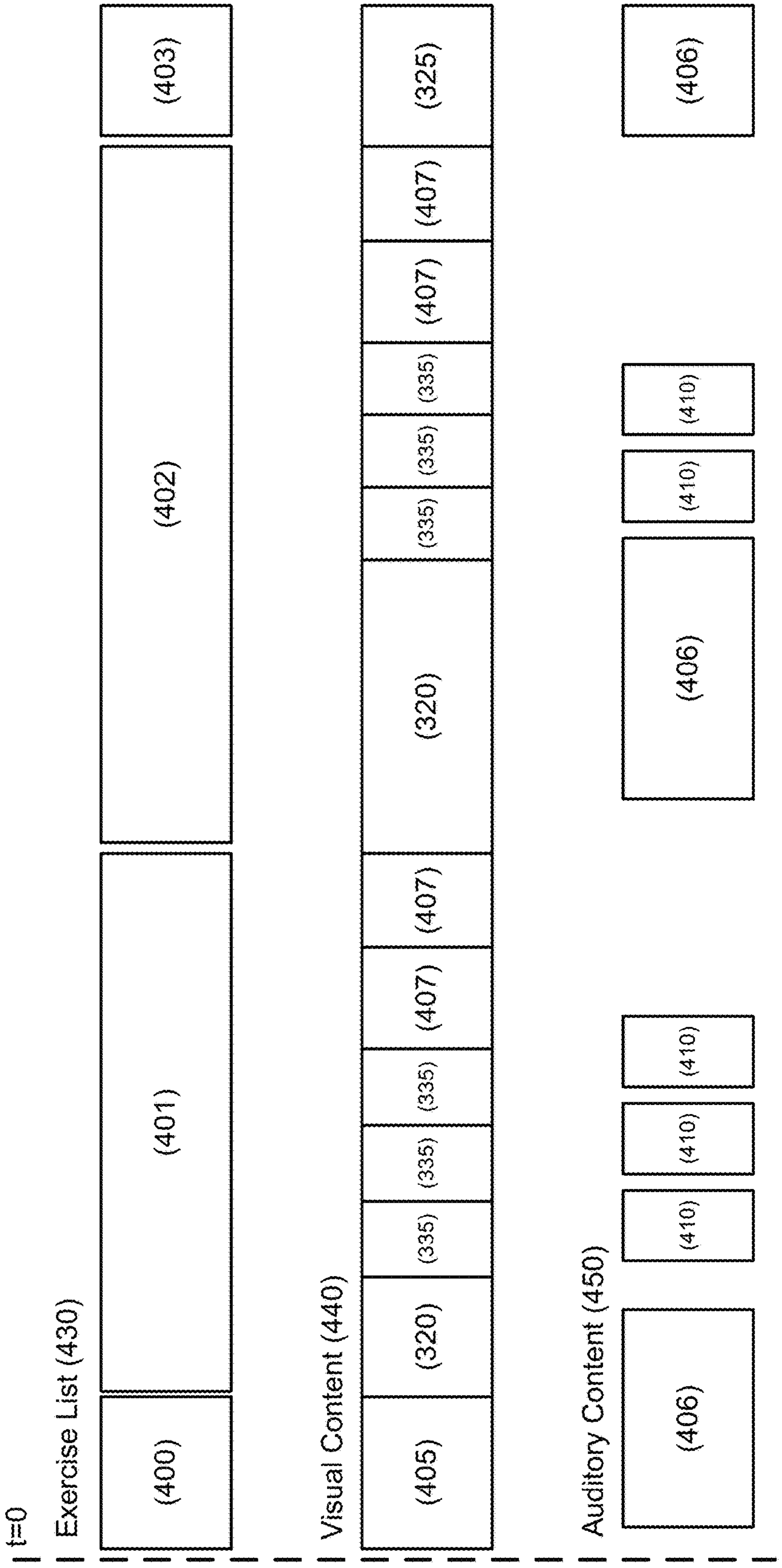
FIG. 4A is a diagram illustrating an example of an exercise timeline in an embodiment of a system for controlling a workout.

FIG. 4A is a diagram illustrating an example of an exercise timeline in an embodiment of a system for controlling a workout, for example that shown in FIG. 2B. In one embodiment, the exercise timeline comprises concatenated exercise sequences (300) from FIG. 3. Time progresses from zero at the left edge of FIG. 4A.

Each horizontal region in FIG. 4A represents one of an exercise list (430), visual content (440), or auditory content (450). For case of illustration, visual content (440) is shown as something on the user display (206) of FIG. 2A at any time when the user is present including fades and black-out clips, but the auditory content (450) is shown in FIG. 4A when instructional or commentary content is present where music tracks or background noise is not shown. In one embodiment, introduction (400) is accompanied by a visual segment (405) and, a short time after the beginning, auditory segment (406) is activated.

At the end of the introduction (400), the first exercise element (401), for example a goblet squat movement, starts with an instructional visual element (320) which the auditory segment (406) flows on from the introduction. As the user progresses in their exercise, reps (335) are available as visual content and the auditory component (410) that is relevant to the repetitions for this particular exercise occurs so as to supplement the visual stimulus. For example, the auditory content in FIG. 4A overlaps breaks in the actual exercise effort by the user but offers continuity in terms of encouragement/motivation to the user.

After the reps (335) have been completed, and the user cools down, video information (407) may still be present. For example, if a background of a group exercise is being used, as the coach is deprecated in the display, the ending workouts of others may be shown to case continuity and to show posture or a gradual reduction in work.

During this changeover period, the next programming information may be loaded to the appliance controller (204) in FIG. 2A. This is the new exercise element (402), for example a bench press movement, and the instruction visual element (320) begins, accompanied by auditory information (406). Once again, as reps are being worked, auditory information (410) may be provided, and is typically different in content to that in the prior exercise (401). As shown in FIG. 4A, this is the end of the exercise (403), so the video content (325) is different from a normal introduction and the concluding matching audio (406) is different as well.

The exercise machine of FIG. 2A may treat the timeline of FIG. 4A ultimately as a single virtual file for display (206) of FIG. 2A, comprised of segments and clips along with matching information for the speakers (206) of FIG. 2A. In this way the resources required by the hardware are reduced and/or kept to a minimum. Generally, visual information (440) is continuous whereas auditory information (450) is relatively sparse, although if background music and/or sounds are desired, this may be mixed in and added.

By separating auditory and visual parts, alternative/supplementary clips may be incorporated. For example, to avoid boredom from any repetitive nature of the coaching audio, it may be desirable to intersperse "small talk" as commentary. When the auditory stream (450) is sparse, there may be an opportunity to fill in the silence with topical items without distraction, which may improve verisimilitude to coaching and reduce impersonal content. There may be emotional or other hazards implicit in arbitrary supplementation and one improvement is reducing this category of content to lighter/trivial matters, avoiding weighty topics that may cause offense/distraction.

As shown in FIG. 4A, a timeline is constructed so as to present a user with appropriately synchronized information in terms of both meeting the need of having lifelike auditory and visual coaching, and so that the coaching accurately matches the exercise itself. Because the exercise machine in FIG. 2A measures the user's performance continually during an exercise, this information may be used to make fine adjustments to tempo and effort without losing continuity. Because information storage is relatively inexpensive, versions of visual information having slightly different timing for aspects of the exercise may be substituted, whereas auditory information may be supplemented by altering the duration of, or filling the silent space that lies between auditory elements.

Figure 4B:
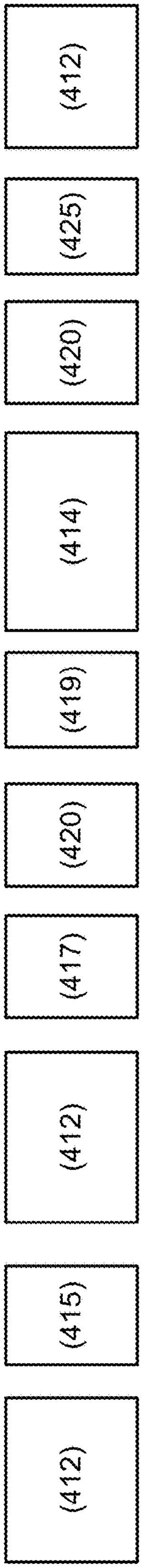
FIG. 4B is a diagram illustrating an example of an auditory clip.

FIG. 4B is a diagram illustrating an example of an auditory clip. The auditory segment (406), also shown in FIG. 4A, comprises utterances that are interspersed with nominally discrete silent periods; the matter of silent periods which result from unvoiced particles of speech is not represented for clarity herein. Utterances (412) are separated by a silent period (415) as might be found when a coach instructs a user to "pull . . . pull" synchronized with the effort to work against a load simulating say a rowing action. The cadence of the "pull . . . pull . . . pull" may exceed the user's working capacity, whether from basic capability or as a result of tiredness and so, in FIG. 4B the silent period (415) may need to be extended to accommodate the reduced user cadence over the workout. However, simply extending the space (415) may be discouraging for a user because the change in tempo that is perceived by the user may be emphasized as a negative response.

An improvement is to extend the effective silent period by inserting a filler word (420) while altering the duration of the silent periods (417) and (419) that now separate the filler utterance (420) from the utterances (412) and (414) respectively to achieve the total delay needed to create the reduced cadence. For example the filler word might be "and" so that the new combined utterance would be "pull . . . and . . . pull" and the time between the instructions to "pull" is now lengthened. In the case where an even longer extension to the cadence is required, a second filler utterance (425) may be inserted after the first filler utterance (420).

When altering silent periods to achieve a total desired cadence timing, the choice of filler words is made with the provision that an utterance sound reasonably natural and not forced, since rapid speech would otherwise cue impatience, which may reduce the user's enthusiasm. The use of tones as filler utterances is also possible, but because this is not a normal part of speech it may prove irritating to a majority of users and is not generally used other than as a countdown cue, where the precursor to a long "start" tone is a series of shorter tones similar to that found in time reference broadcasts.

Data Structure. In order to support a timeline as shown in FIG. 4A, media clips may be organized using tags or any metadata without limitation that allow on-the-fly editing of the visual/auditory content at the client/exercise machine, for example for auditory content:

TABLE 1

Example Tags/Metadata for Content

| Tag | Description |
|---|---|
| coach | flag on for content where coach is speaking |
| encouragement | flag on for content with encouraging coaching |
| constructive | flag on for content with constructive coaching |
| upbeat | flag on for content with upbeat coaching |
| downbeat | flag on for content with downbeat coaching |
| fierce | flag on for content with fierce coaching |
| gentle | flag on for content with gentle coaching |
| movement | list of which movement(s) content is associated with, for example {"bench press," "angled bench press"} |
| side | enumerated values for content being associated with a "left" side, "right" side, "either," or "both" sides in relation to a movement. |
| weightOn | flag on for content appropriate when weight/resistance is actively exerted on user. |
| lastMinutes | value/range of how many last minutes of a movement the content is associated with, for example a clip may be appropriate for the last value = 5 minutes of a movement. |
| prescribedReps | value/range of how many prescribed reps of a movement the content is associated with, for example a clip may be appropriate for the rep number range = [1 thru 10] of a movement |
| lastPlayed | value/range of when the clip was last played, for example a clip may have been played last at value = 15:08 UTC. |

In one embodiment, for the group workout in FIG. 2B, the host/leader/owner (200$e$) creates a group session by choosing a workout, for example a bench press workout, and obtaining a shared ready signal such as a shared code. A shared identical timeline, such as (430), (440), and/or (450) shown in FIG. 4A, is also created at this time. This timeline is saved to remove user personalization that would prevent users from having an identical experience. The code is then shared with other potential participants (200$a$)-(200$m$). Participants who wish to join (200*a*), (200*c*), (200*d*), (200*f*) may transmit a ready signal such as entering a shared code on their trainer.

If the host (200*e*) has not started the chosen workout yet, participants (200*a*), (200*c*), (200*d*), (200*f*) may join a "waiting room" that shows the current participants as they join the session. The host (200*e*) has an option to start the workout from the waiting room. The waiting room may be a screen, for example, shown on each display (206) of each trainer in FIG. 2A. If a fixed number of participants is expected, the system may autostart the workout when all participants arrive.

Once the workout starts, context and/or information from participants is forwarded to the group workout synchronizer (252). This server routes these messages to other participants. In one embodiment, routing is done over websocket and/or via a server push. The server (252) may also intercept messages to keep a coordinated workout state. This type of communication is referred to herein without limitation as "socket communication," and includes but is not limited to profile information, set begin and end, rep counts, time percentage, and workout volume. As referred to herein, workout volume is the product of the number of reps and weight lifted, for example 10 reps of 10 lbs is a workout volume of 100 1b·reps.

Figure 5A:
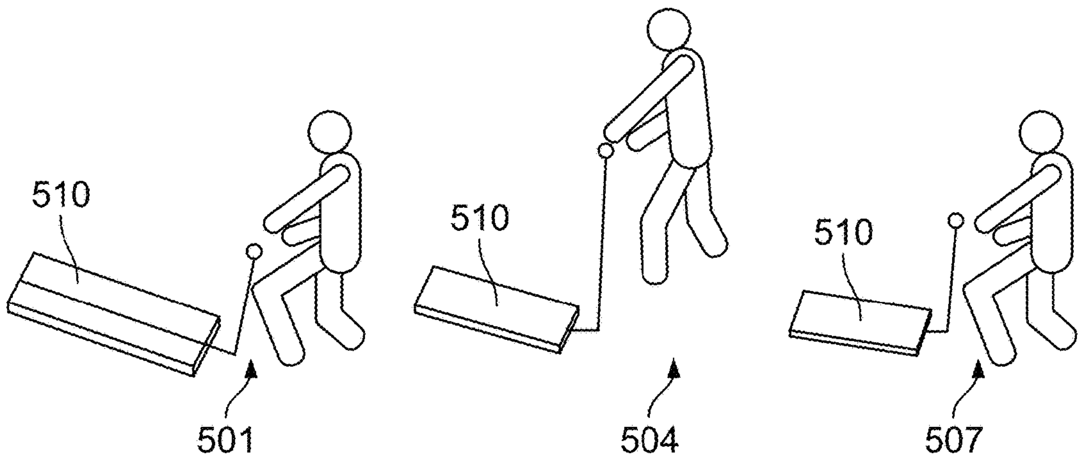
FIG. 5A is a diagram illustrating an example of an exercise.

FIG. 5A is a diagram illustrating an example of an exercise. In one embodiment, as exercise a user pulls against a cable routed through an extension arm (510) of the exercise machine. User position (501) illustrates a user in a squat position ready to begin an upward thrust. At user position (504) the user has reached the full extension. Following, the user returns back into the squat position at user position (507). In one embodiment, alteration of the visual segments is achieved by slowing the playback rate so that the user's actions are better aligned.

As a user tires, the rate at which the exercise may be continued declines and so the time between these three exemplary states, squat (501)—extended (504)—squat (507), increases. Simply slowing down the playback rate of the video may reduce the exercise cadence, but the synchronization with the user's motion is likely to be poor. This is because the actual movement portion from (501) to (504) and from (504) to (507) may remain relatively close in speed to that achieved earlier, with pauses being generated by the user at the stationary points as they catch their breath and/or physically recover.

Figure 5B:
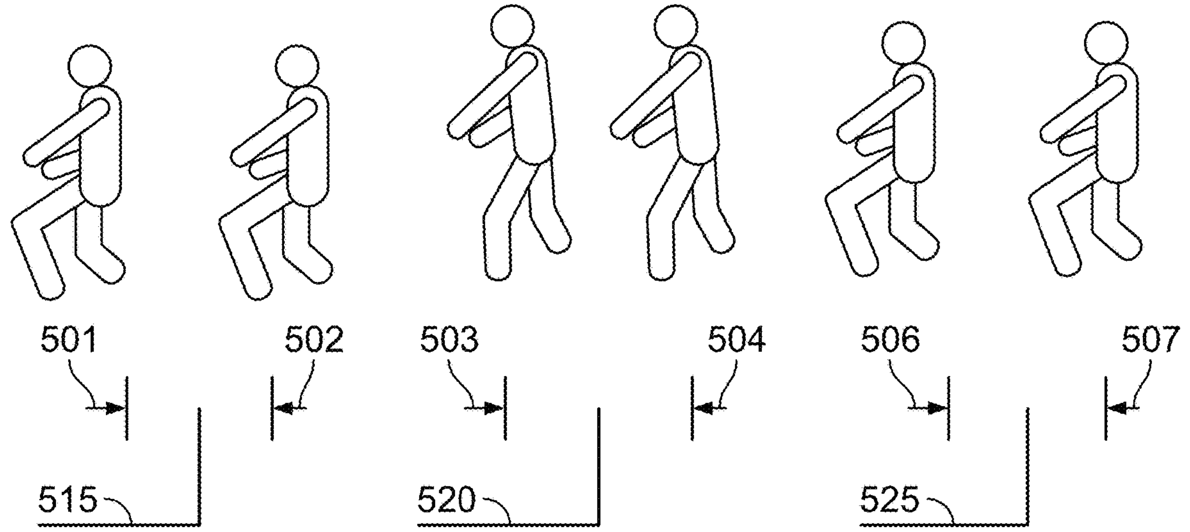
FIG. 5B is a diagram illustrating an alternate example of the exercise.

FIG. 5B is a diagram illustrating an alternate example of the exercise in FIG. 5A. In one embodiment, a brief pause is allowed, inserted as shown in FIG. 5B at the point where a movement is reversed, temporarily passing through a zero movement period. Here, the frame at the squat position (501) may be either paused for a brief time (515) wherein the visual motion continues at position (502), or the visual content local to this minimum movement segment is simply slowed to give the desired delay time (515). This solution of creating delay in playback at a minimum of movement is an improvement as the user's perception of freeze frame activity is significantly reduced when in a period that activity is minimal. Similarly, as the user approaches the extended position (503) the system delays by a time (520) to position (504) wherein a user relaxes to the squat position (506) and the system introduces delay (525) before resuming at position (507).

By contrast with periods of rapid movement where any delays introduced produce the appearance of jerky motion such as when a moving scene is illuminated with a stroboscope, a user may be less distracted by brief pauses synchronized to points of reversal. Using this technique, delays of several hundreds of milliseconds may be absorbed which correspond well to the natural delays that occur as a user tires during an exercise sequence. If longer delays are required, a visual segment with a different actual cadence may be used with an ability to change from one visual segment with one cadence to another visual segment with another cadence, such that it is hardly perceptible to an exercising user.

In one embodiment, the video element is replaced by cutting away temporarily to a different scene and then cutting back to the replacement video segment operating at a different cadence. Such a different scene can, for example, be informational such as showing a stick figure representation of postural information encouraging the user not to slouch or favor one articulation over another. Introducing commentary that recognizes a variety of postural errors that correlate with the reduction in exercise performance may be drawn from a database of exercise statistical information collected from a wide sampling of exercise machines that are already connected.

The creation of a variable timeline which departs from a fixed, predetermined schedule to accommodate a user's tendency to vary the cadence over the normal duration of an exercise is referred herein as "time-flex." This concept is also directly applicable to the desire of a user to make alterations to the exercise schedule while the exercise is in progress; for example if a user is feeling energetic, the addition of one or more additional reps may require the insertion of a matching one or more visual sequences, coupled with a change of auditory segments so that the user is encouraged to put out greater effort.

These insertions may be performed so as to add to the visual sequences and may not necessarily be simply a repeat of a previous segment. In one embodiment, the user is supported by being shown a more developed exerciser(s) to convey the image of an advanced performance exhibiting the characteristics of better stamina/technique. The auditory cues may also be differentiated to emphasize aspects of the exercise such as better breathing control or more even application of exercise forces.

Trigger Loops and Triggered Actions. A "trigger loop" is used by the controller (204) of FIG. 2A to loop visual and/or auditory content based on context. One example of a trigger loop is during a setup, for example setup event (310) in FIG. 3, where a user (220) needs to set up a machine in a different configuration for an exercise, say rotate part of the machine (202) to prepare it for bench press. While the machine is looking for a context trigger, in this case from sensor (210) to see whether the machine part has been rotated, visual and/or auditory content is looped. Similarly, actions involving playback of visual and/or auditory content on display (206) may be triggered from a context trigger.

Reverse Time-Flex. Time-flex may be used to keep looping visual and/or auditory content until an end of a set. In one embodiment, time-flex includes starting media content for an exercise movement and forming two program loops. In an outer program loop, the next group of media content is played. In an inner program loop within the outer program loop, for each of the group of media clips being played, it is determined whether the user is done. If no, control remains in the inner loop, and if yes, the inner loop is broken out of if the user moves on to another movement with a corresponding group of clips, or the inner and outer loops are broken out of if the user is done. In this way, the media sequences may be flexible and customized in time to a specific user, depending on if they are slower or faster. A "reverse time-flex" is used to have a content, for example auditory content, not start until a user begins a set. In the case of a reverse time-flex, the content waits for the user to start.

Figure 6A:
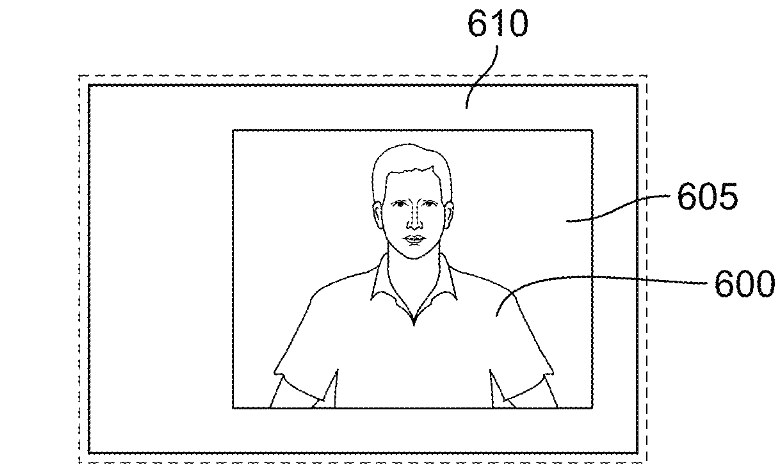
FIG. 6A is a diagram illustrating an example of a foreground visual in an embodiment of a system for controlling a workout.

FIG. 6A is a diagram illustrating an example of a foreground visual in an embodiment of a system for controlling a workout, for example that shown in FIG. 2A. When a visual segment is primarily a foreground exhibit, the user exercising is being addressed or instructed directly by a coach, whether live, virtual, animated, or computer-generated. The foreground image (605) contains the coach (600) and is presented on top of the background image (610).

This may be achieved using a "green screen" technique, where the "green" background color is replaced by the desired background so as to make it appear that the coach is present in the background scene. However, during the progress of an exercise, having a single observer presented on the screen may be perceived by some users as being undesirable or intrusive; the sensation of being watched or stared at may result in a strong emotional reaction that impedes the exercise and alternatives may be provided for a more congenial scene.

Figure 6B:
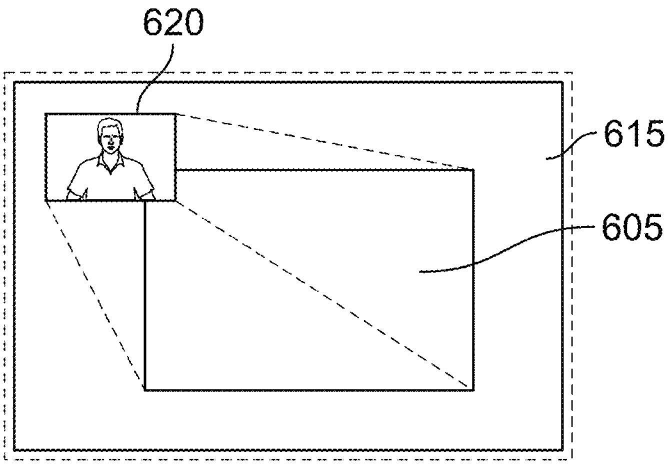
FIG. 6B is a diagram illustrating an example of a replacement visual in an embodiment of a system for controlling a workout.

FIG. 6B is a diagram illustrating an example of a replacement visual in an embodiment of a system for controlling a workout, for example that shown in FIG. 2A. In one embodiment, the original foreground image (605) of FIG. 6A is reduced to a smaller inset (620) and the background (615) is either retained as it was at (610) or else may be used to show a different aspect of the exercise room with exercising users. The replacement scene (615) may be selected in any of a number of ways. For example, it may be pre-determined by the programming sequences that make up an exercise or exercise routine or else invoked by the user through a command option using controls that are accessible to the user.

In one embodiment, the user is prompted to indicate a background category and may select a matching exercise group of participants. In another implementation, the background is kept consistent and a coach (600) is cast to the foreground (605) for direct instruction, collapsing to a small inset (620) while the exercise continues. The inset may be brought to the foreground in response to the detection of user error during the exercise, correctional observations provided, and then the inset restored to a minor position on-screen once this action is completed.

Figure 6C:
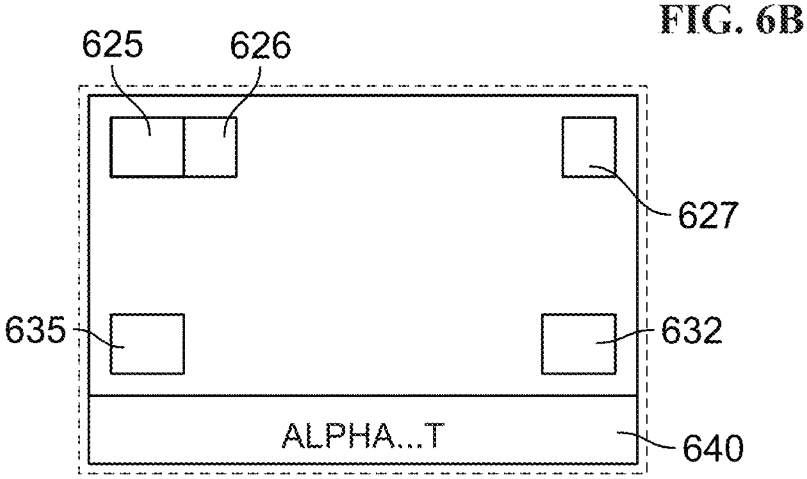
FIG. 6C is a diagram illustrating an example of a correction visual in an embodiment of a system for controlling a workout.

FIG. 6C is a diagram illustrating an example of a correction visual in an embodiment of a system for controlling a workout, for example that shown in FIG. 2A. As illustrated by FIG. 6C, following a correction element where the coach is brought to the foreground, the background is changed after the correctional advice is delivered and the collapsing of the foreground image of the coach moved to one of several alternative positions, (625), (627), (632) or (635) on the screen. This is an improvement that attempts to keep the user engaged and reduces boredom that may result from an unchanging visual program. The behavior of the visual controller has significant flexibility that allows each user to experience a range of engagements with the exercise machine and its coach(s). There are no implicit restrictions on the media that supports the user's exercise regime and timing of events. The duration of segments as well as the positioning of the information are freely alterable, with the caution that they support the user's workout and not distract the user by being unpredictable.

FIG. 6C also shows the addition of text information (640) that may be used to reinforce advice and/or cue emphasis. The position is shown for this example at the base of the visual display but may be in any position on the screen. For example, subtitles and count-down information may be shown for those that are hearing impaired. In one embodiment, the accessibility displays may be positioned so as to make it easier for the hearing impaired to view both text and a signing artifact, shown here as (626) adjacent to the active inset image at (625).

Content Creation and Algorithmic Development. In one embodiment, a dashboard or other authoring tools are used to create, edit, select, and/or remove any combination of user interface (UI) elements comprising: coach, model, voice audio, music, haptic, graphics, and/or public relations halo for a given workout and/or timeline. A selector may be at least one of the following: an engineer, a non-technical creator, a user, and a third-party. A non-technical creator may use a dashboard or other authoring tool to enable a non-technical coach and/or user to build their own workout. This permits a user a continuum from a completely guided workout to a completely custom workout, and includes elements of both. For a third-party, an application programming interface (API) enables third parties to build and submit workouts for use on the machine (202) of FIG. 2A.

Rewards. An essential component of a successful exercise strategy is rewarding the user for completion of meeting particular goals. The controller (204) and/or processor (208) of FIG. 2A may include using a celebration routine that provides gratifying events for the user.

In one embodiment, the reward is an auditory/musical sequence accompanied by a visual sequence displayed to the user. This is appended to the timeline to coincide with a particular predetermined goal. For example, a measure of user performance such as completion of an exercise routine within a particular time limit may invoke this celebration sequence. For hearing impaired users, the resistance/loading mechanism may provide haptic/tactile stimulation by applying a pulsating load, along with a visual sequence that celebrates achievement.

In one embodiment, the user earns bonus points which allow the selection of supplementary exercises and/or graduation to a different competitive level. This latter implementation may be applied as part of a loyalty program administered by segments of the hospitality industry in which keys for program participants may comprise the access qualification for a range of perquisites not provided for the general public. One particular benefit of an exercise machine based on a media centered controller which incorporates a dynamically alterable timeline is that a fully customized experience is practical and thus may be used to augment certain brands while retaining the same basic mechanical design and appearance.

A user may be unable to complete an exercise successfully or else may progress to completion at a slower rate than anticipated. As shown above, the controller (204) may provide a modified timeline sequence that accommodates a user's incapacity. For example, if the user experiences a stamina hurdle where the usual numbers of repetitions are not achievable or exceed the limits of a predetermined working range, then alternative video sequences may be selected to replace the standard sequences. For users with physical disabilities, range of motion may be a restriction, but because the exercise machine (202) is interactive and able to measure actual performance, visual and/or auditory elements may be adjusted for the disability for the display (206).

The visual segments that appear in a timeline generally account for the performance level of the user. For example, a user may choose to set the starting value for the exercise set being used to "20% increase." The user records may then be updated to reflect these user selections. If the user typically chooses to offset the starting value for the exercises and shows no performance deterioration, then for that specific set when used again, the exercise machine may use this typical setting as a starting point.

A significant user group is the elderly or infirm that seek to improve their condition through exercise and it may be clear that if the coaching presentation is too mismatched with the expectations of the individual user then this can be seen as discouraging. Accordingly, in the same way as described for the use by a user with physical disabilities, the exercise machine (202) selects and modifies the timeline content based on user input and actual user performance as exercise proceeds.

The timeline may be responsive to user performance that allows the user to interact with a personal trainer or coach without having to be physically present at the same location as the coach. A dynamically alterable sequence accommodates changes to improve coaching. The controller provides appliance control synchronized to pre-determined lessons or exercise sessions that may be altered automatically and/or on-the-fly to accommodate the user's requirements by inserting and/or removing visual elements and auditory elements that make up the appliance interaction interface.

Exercise sessions may be stored in memory and/or downloaded from a remote server and these sessions comprise linked media components that give a user a flexible instructional and motivational environment within which to exercise. The controller monitors the user's exercising and selects exercise program sequences and creates the timeline that defines, adjusts or modifies the base exercise program to optimize user performance.

By sharing the timeline of FIG. 4A across each user in the group in FIG. 2B, a similar experience is shared between each user in the group. This similar experience is improved if each user (200*a*), (200*c*), (200*d*), (200*e*), (200*f*) starts a set together. In one embodiment, an initial synchronization signal is transmitted from server (252) to the plurality of designated users (200*a*), (200*c*), (200*d*), (200*e*), (200*f*) such that the plurality of designated users begin a workout phase in a synchronized manner and then proceed with the workout phase asynchronously.

That is, with a set-based exercise, users will likely set their own pace during each set, but the set-based workout system disclosed allows each user to still be synchronized within the group. Note that sharing a timeline does not necessarily mean identical workouts, and in one embodiment, user (200*a*) may bench press 10 reps of 100 lb while user (200*c*) bench presses 15 reps of 200 lb, but the coach/timeline for bench press will coach and encourage at each user's pace and effort. That is, each member of the group gets the same timeline and sees their own personal version of the same virtual coach trainer but with their own personal time-flex insertions of encouragement/filler words to get them through the set.

In another embodiment, the timeline is strictly shared across users so that users see a virtual coach/timeline encourage other users via time-flex. That is, each member of the group gets the same timeline and a shared version of the same coach trainer so they see/hear when their colleague is getting encouragement.

In one embodiment, a "true live" delivery of media to each of the plurality of designated users (200*a*), (200*c*), (200*d*), (200*e*), (200*f*) is set up by first measuring and monitoring latency from server (252) to each user (200*a*), (200*c*), (200*d*), (200*e*), (200*f*) and then pacing the messaging/set switches/socket communications to users so that each user (200*a*), (200*c*), (200*d*), (200*e*), (200*f*) receives messages at approximately the same time.

In one embodiment, the latency metrics measured/monitored are also shared with an auxiliary channel used for streaming media such as a visual/auditory stream broadcast from a coach to each user (200*a*), (200*c*), (200*d*), (200*e*), (200*f*). This auxiliary channel may be a third-party channel using low-latency techniques to provide a seamless social interaction over visual/auditory streams.

At the end of each set, a user, for example user (200*c*), may receive additional information from a coach/timeline post-set using triggered loops, and/or may be placed in a post-set waiting room. In one embodiment, a more permissive time-flex is used aside from the time-flex described above mainly applies to waiting for a set to start or end. That is, the loop is between sets with trigger described below. In one embodiment, the post-set waiting room includes a video preview of the next set. In one embodiment, a status signal indicating completion of the workout phase/set is sent from user (200*c*) to server (252). Users may directly interact with each other by using a "clap" functionality that sends text, visual, and/or auditory encouragement to another participant. In one embodiment, other "rewards" besides claps and those described above may be made available, for example reward points for prizes, reputation points for leaderboards, currency, and so on.

When a threshold number of strength trainers (200) finish their set, the server (252) sends a signal to participants that continues the workout to the next set. If the pace is slow or messages get lost, the host (200*e*) has a "continue" signal/button/widget that allows manual continuation of the workout to the next set. In one embodiment, a resynchronization signal is sent to the plurality of designated users (200*a*), (200*c*), (200*d*), (200*e*), (200*f*) upon determining that the plurality of status signals exceeds a threshold such that the plurality of designated users begin a subsequent workout phase in a synchronized manner and then proceed with the subsequent workout phase asynchronously. In one embodiment, the threshold is the summation of a count of all users in the plurality of designated users including the host user, that is, all users nominally complete the current set before the workout proceeds to the next set.

Figure 6D:
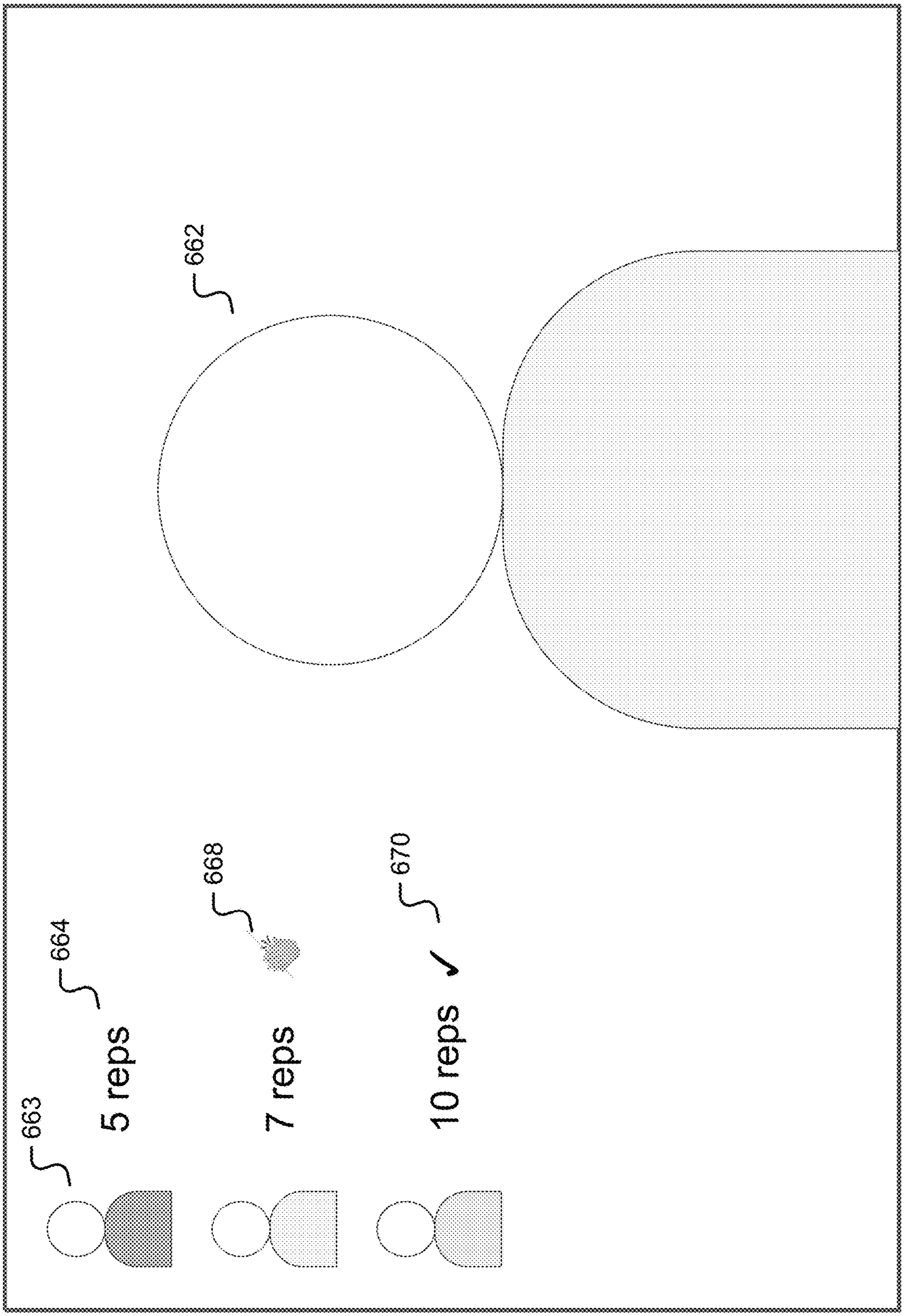
FIG. 6D is a diagram illustrating an example of a remote information rendering/visualization in an embodiment of a system for controlling a workout.

FIG. 6D is a diagram illustrating an example of a remote information rendering/visualization in an embodiment of a system for controlling a workout, for example that shown in FIG. 2A. During a set and/or after a set in a post-workout waiting room, a given user, for example (200*a*) may view a rendering of socket communications for their own performance as well as one or more of the other designated users (200*c*), (200*d*), (200*c*), (200*f*). In the example of FIG. 6D, a rendering of a user (662) and/or coach (662) is accompanied by a rendering of other designated users, for example user (200*c*) as rendering (663). Socket communications may include claps as shown as (668) in FIG. 6D, rewards, profile information, set begin, set end, repetition counts as shown as (664) in FIG. 6D, time percentage, workout volume, weight lifted, progress rate, heart rate, breathing rate, completed set as shown as (670) in FIG. 6D, and vital statistics. The rendering of socket communications is done to improve encouragement for the group workout.

Figure 7A:
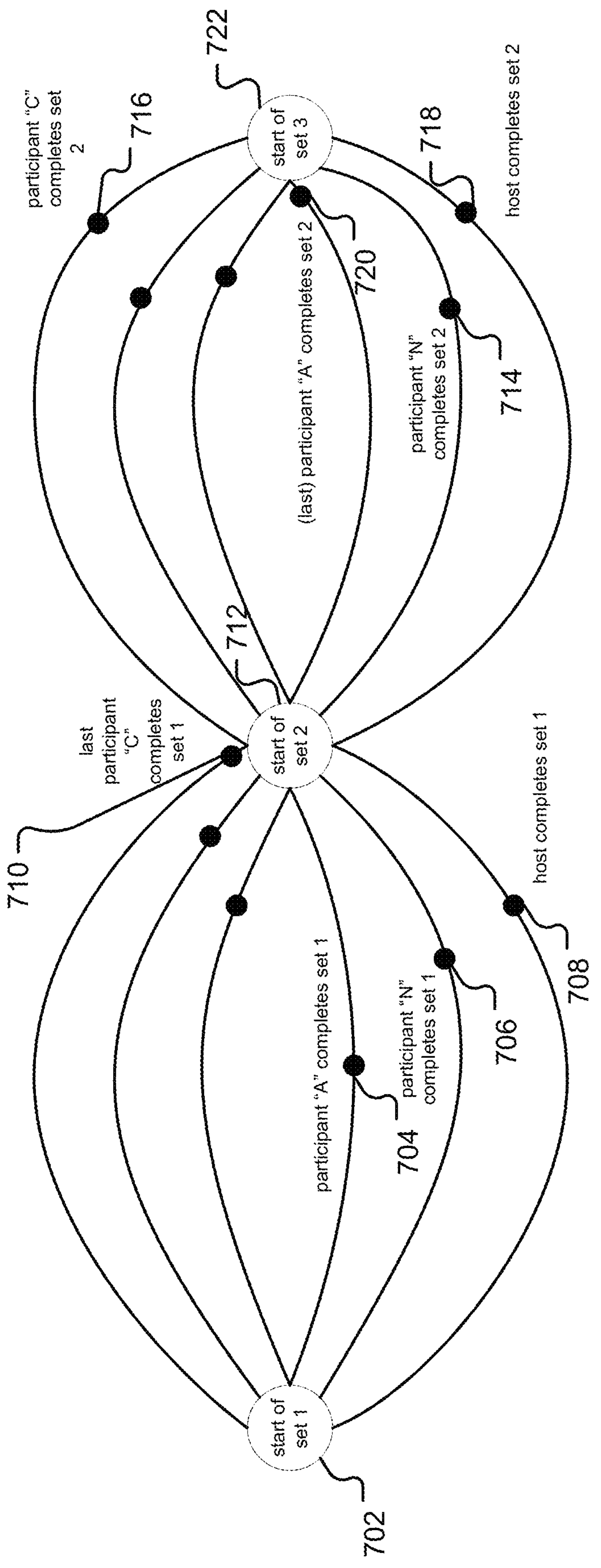
FIG. 7A is a diagram illustrating a conceptual example of synchronization in an embodiment of a system for group workouts.

FIG. 7A is a diagram illustrating a conceptual example of synchronization in an embodiment of a system for group workouts. In the example shown in FIG. 7A, the server (252) in FIG. 2B starts the first set (702) by sending an initial synchronization signal to the plurality of designated users, so they all start the set at the same time.

A participant "A" completes the first set first at point in time (704) which updates a status signal for "A" indicating completion of set 1, followed by the same for participant "N" at time (706). A third participant, who happens to be the host, completes the first set at time (708), and other participants complete the set until the last participant "C" finally completes the first set at time (710). Shortly after, the server (252) determines the status signal count exceeds a threshold, for example as shown in FIG. 7A, a threshold of all six designated users including the host, and a resynchronization signal is sent from server (252) to all participants including the host, so that they may begin a second set (712) together in a synchronized manner.

As can be seen in FIG. 7A, users may complete at different times for different sets, and participant "N" completes set 2 at time (714), participant "C" completes set 2 at time (716), the host completes set 2 at time (718), and for the second set the last participant is "A" at time (720). As for set 1, the threshold of all six users is exceeded and the resynchronization signal is sent so that all six participants may begin a third set (722) together.

Apart from FIG. 7A, a "social workout" mode may also be employed, which would be a completely asynchronized workout model. Without resynchronization points (702), (712), (722), it would simply be users working out at the same time, who could audit presence via socket communications, audit what other users are doing, audit their stats and encourage them, even if they are not doing the same workout and/or movement.

Figure 7B:
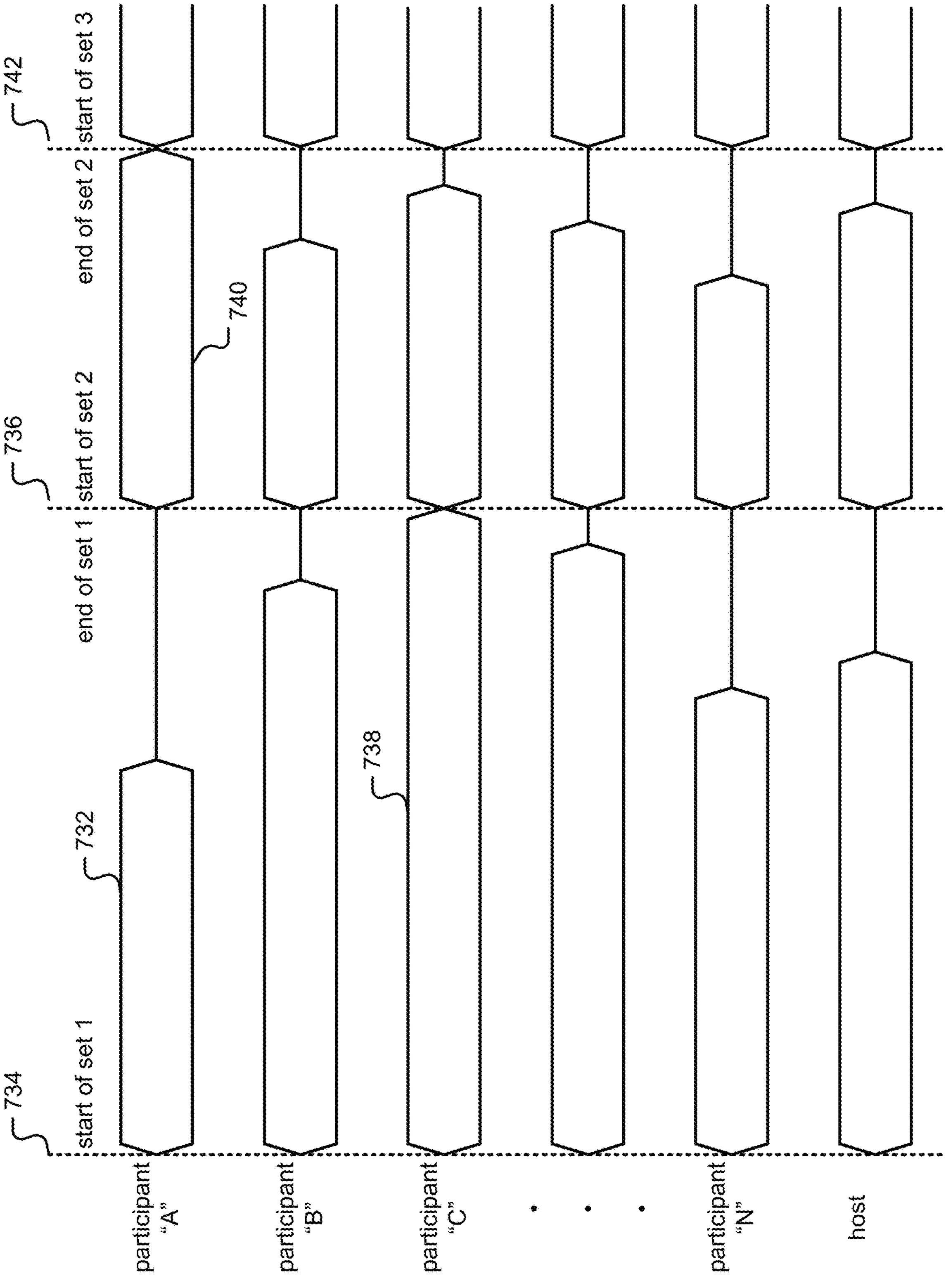
FIG. 7B is a timing diagram for a group workout.

FIG. 7B is a timing diagram for a group workout. In one embodiment, the timing diagram of FIG. 7B corresponds to the conceptual example of FIG. 7A.

In the timing diagram, each six-sided band (732) represents the set workout phase for a given user, for example participant "A." The left edge of the band (732) is the start of the user's set workout, for example the start of set 1 (734), and the right edge of the band (732) is the end of the user's set workout, when the status signal is sent to server (252) and the user has a post-workout time-flex and/or post-workout waiting room while waiting for a threshold to be exceeded and the end of set 1/start of set 2 (736).

Corresponding to FIG. 7A, it is participant "C" (738) who is the last participant to complete set 1 and thus provides the last status signal to exceed the threshold to end set 1/start set 2 (736). Also corresponding to FIG. 7B, it is participant "A" (740) who is the last participant to complete set 2 to end set 2/start set 3 (742).

In one embodiment, a "true async" mode is provided for a participant, for example participant "B" shown in FIG. 7B. In true async mode, participant "B" could join a past group workout at any time and socket communications would be streamed to participant "B" as if they were another participant at the time the group did its live workout. This provides a historical and/or motivational pacing for participant "B" without requiring coordination for an actual group workout. This mode may start out by participant "B" asserting an "async ready" signal.

Figure 7C:
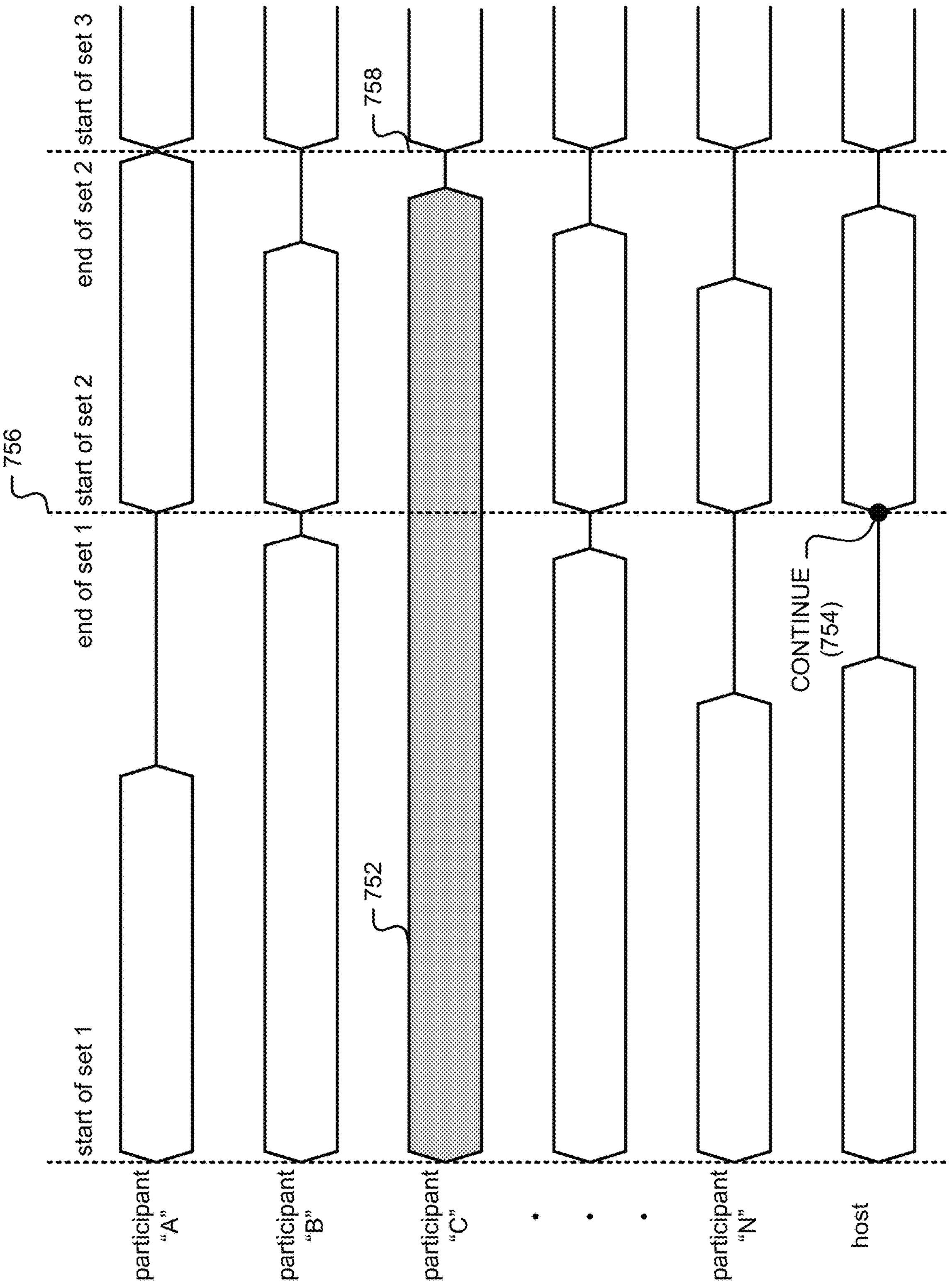
FIG. 7C is a timing diagram for a group workout with a continue signal.

FIG. 7C is a timing diagram for a group workout with a continue signal. As shown in FIG. 7C, participant "C" is not able to complete set 1 for some time (752), for example because they are slow to workout. In one embodiment, the strength trainer associated with participant "C" detects if participant "C" has left the machine temporarily or permanently and notifies the host. In one embodiment, the strength trainer associated with participant "C" may detect if participant "C" did not start set 1 at all, and notifies the host or eliminates them from the plurality of designated users for set 1/reduces the threshold of the status signal count.

In any event, the host sees the prolonged workout phase for participant "C" (752) and assert the continue signal (754) manually. This signal (754) ends set 1 and starts set 2 (756) for the rest of the participants and host. As shown in FIG. 7C, if participant "C" is still working out, they may end their set 1 when others are still in set 2, and then resynchronize with them for the start of set 3 (758).

In one embodiment, this allows a user such as participant "C" to be mostly synchronized in a workout, or to skip a set and still stay in sync. Facility may be provided to allow a user to get out of sync but give them a way to come back in sync by explicit socket communications between users such as participant "C" and the host, or through implicit gestures such as participant "C" walking away from the machine.

Figure 7D:
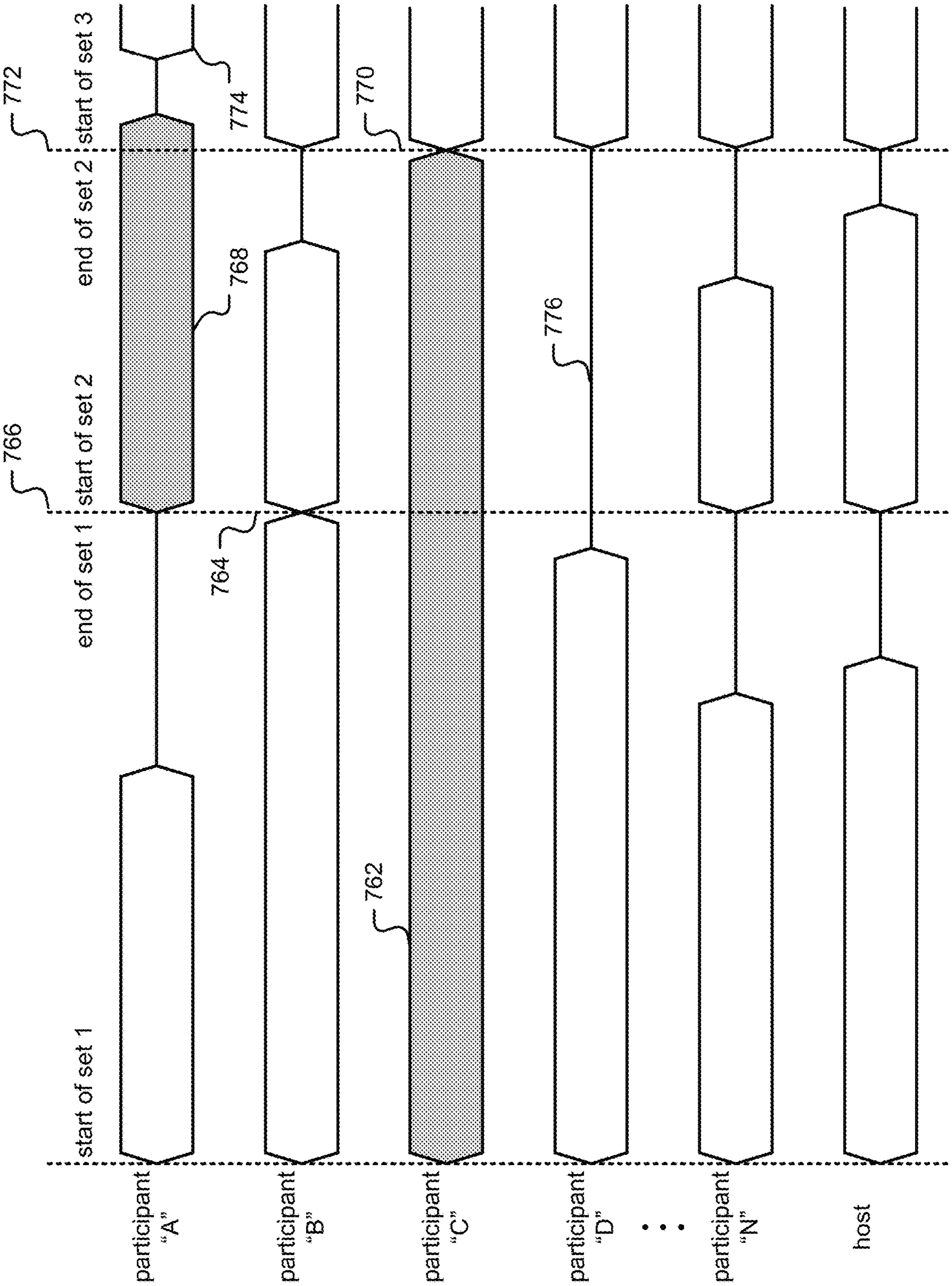
FIG. 7D is a timing diagram for a group workout with a smaller threshold.

FIG. 7D is a timing diagram for a group workout with a smaller threshold. As shown in FIG. 7D, participant "C" is the last to complete set 1 (762), and the threshold is set to be one less than the full set of status signals from every user. Thus, when the second last participant "B" completes their set 1 (764), the start of set 2 (766) happens for every user except the last participant "C."

Similarly, during set 2 participant "A" is slow (768) and participant "C" happens to be the second to last participant to complete (770) a set, in this case their set 1. The threshold is thus exceeded and the start of set 3 (772) is called, so participant "A" is left out of the resynchronization for set 3. Note that participant "A" may start the set 3 late after completing set 2 (774). Another case is that of participant "D" in set 2, which is a fully skipped set (776), and they may resume for set 3. One improvement that a smaller threshold brings as shown in FIG. 7D is a motivation to not be the "odd man out" when doing reps and sets with a group.

Figure 8:
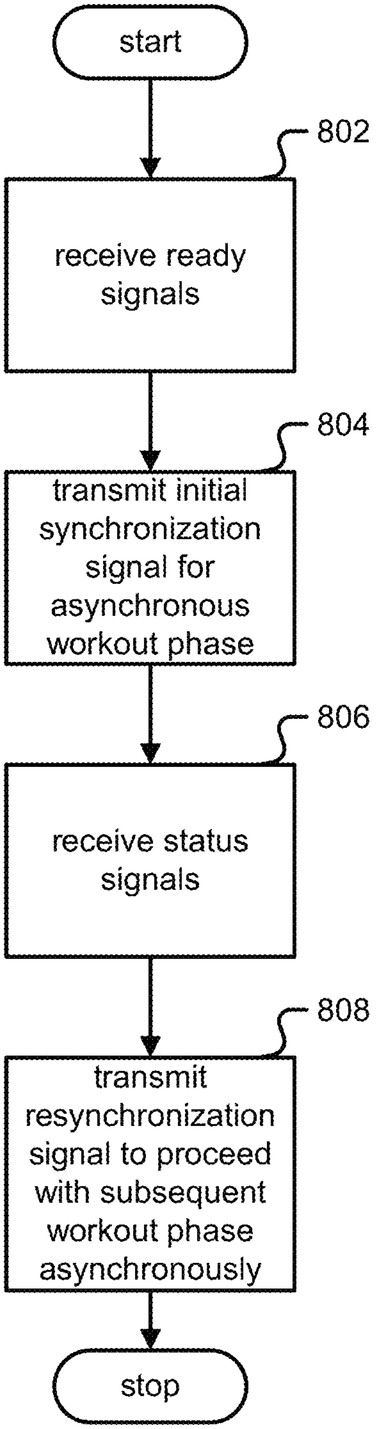
FIG. 8 is a flow diagram illustrating an embodiment of a process for group workout synchronization.

FIG. 8 is a flow diagram illustrating an embodiment of a process for group workout synchronization. In one embodiment, the server (252) of FIG. 2B carries out the flow of FIG. 8.

In step (802) a plurality of ready signals from a plurality of designated users is received.

In step (804) an initial synchronization signal is transmitted to the plurality of designated users such that the plurality of designated users begin a workout phase in a synchronized manner and then proceed with the workout phase asynchronously.

In step (806) a plurality of status signals indicating completion of the workout phase by at least some of the users is received.

In step (808) a resynchronization signal is transmitted to the plurality of designated users upon determining that the plurality of status signals exceeds a threshold such that the plurality of designated users begin a subsequent workout phase in a synchronized manner and then proceed with the subsequent workout phase asynchronously.

In one embodiment, the resynchronization signal is transmitted to the plurality of designated users upon determining that a continue signal has been received from a host user, for example as described and shown (754) in FIG. 7C.

In one embodiment, the threshold is a summation of a count of all users in the plurality of designated users including the host user. In one embodiment, the host user determines a workout associated with the workout phase and the subsequent workout phase, and wherein the workout is a set-based group workout. In one embodiment, the host user identifies and assembles one or more of the plurality of designated users.

In one embodiment, a socket communication received from one of the plurality of designated users is transmitted, for example by server (252) of FIG. 2B. The socket communications include at least one of the following: claps, rewards, profile information, set begin, set end, repetition counts, time percentage, workout volume, weight lifted, progress rate, heart rate, breathing rate, and vital statistics. In one embodiment, the socket communications use a websocket protocol.

In one embodiment, each workout phase is associated with a media timeline, for example a timeline shown in FIG. 4A. The media timeline may pace a media presentation for each of the plurality of designated users using a time-flex protocol. The media timeline may be shared between two or more users of the plurality of designated users. The media presentation may be shared between two or more users of the plurality of designated users.

In one embodiment, latency is measured for each user of the plurality of designated users, and wherein a media presentation for each of the plurality of designated users is paced to each user based at least in part on the measured latency. A socket communication for each of the plurality of designated users may be paced to each user based at least in part on the measured latency.

In one embodiment, an async ready signal is received from a new designated user to be synchronized with a recorded set of signals from a previous workout, wherein the recorded set of signals include an initial synchronization signal, a status signal, and a resynchronization signal.

In one embodiment, a social ready signal is received from a new designated user to audit a set of signals from a current workout, wherein the set of signals include an initial synchronization signal, a status signal, and a resynchronization signal.

Figure 9:
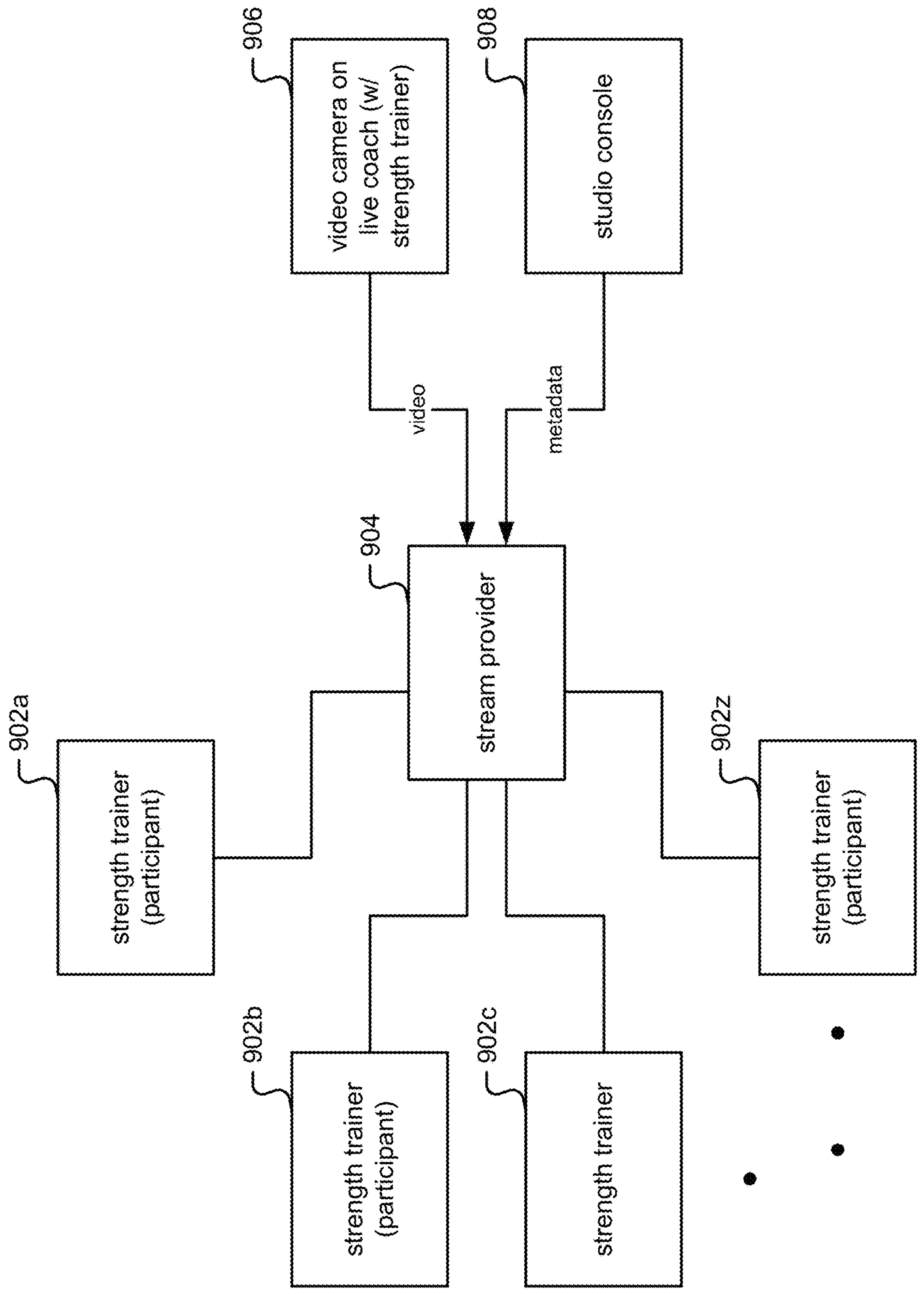
FIG. 9 is a block diagram illustrating an embodiment of a system for live workouts.

Live Workouts. FIG. 9 is a block diagram illustrating an embodiment of a system for live workouts. In one embodiment, the strength trainers shown in FIG. 9 are the embodiments (200) in FIG. 2A each for a different user and/or participant.

One or more strength trainers (902*a*), (902*b*), . . . , (900*z*) are shown coupled via a network to a stream provider (904), which may be a server as described in FIG. 1 at least in part comprising a processor (102) and network interface (116), a part of a server, a plurality of servers, and/or a cloud-based server such as one provided by Amazon Web Services (AWS), Google Cloud Platform, Microsoft Azure, IBM Cloud, or Oracle Cloud.

As shown in FIG. 9, a live coach is captured by one or more video cameras (906) and transmits a video stream to stream provider (904). A studio console (908), often operated by a studio associated with the live coach, is used to provide an additional metadata stream to stream provider (904). The stream provider (904) provides both video stream and metadata via a network such as the Internet to participants (902*a*), (902*b*), and also a user who participates later, for example midway through the workout (902*c*).

In one embodiment, the stream provider (904) and/or other server provides the technical facility for assembling the group and/or provides the social facility for in-band or out-of-band chat such as text messages, auditory messages, and/or visual messages.

Figure 10:
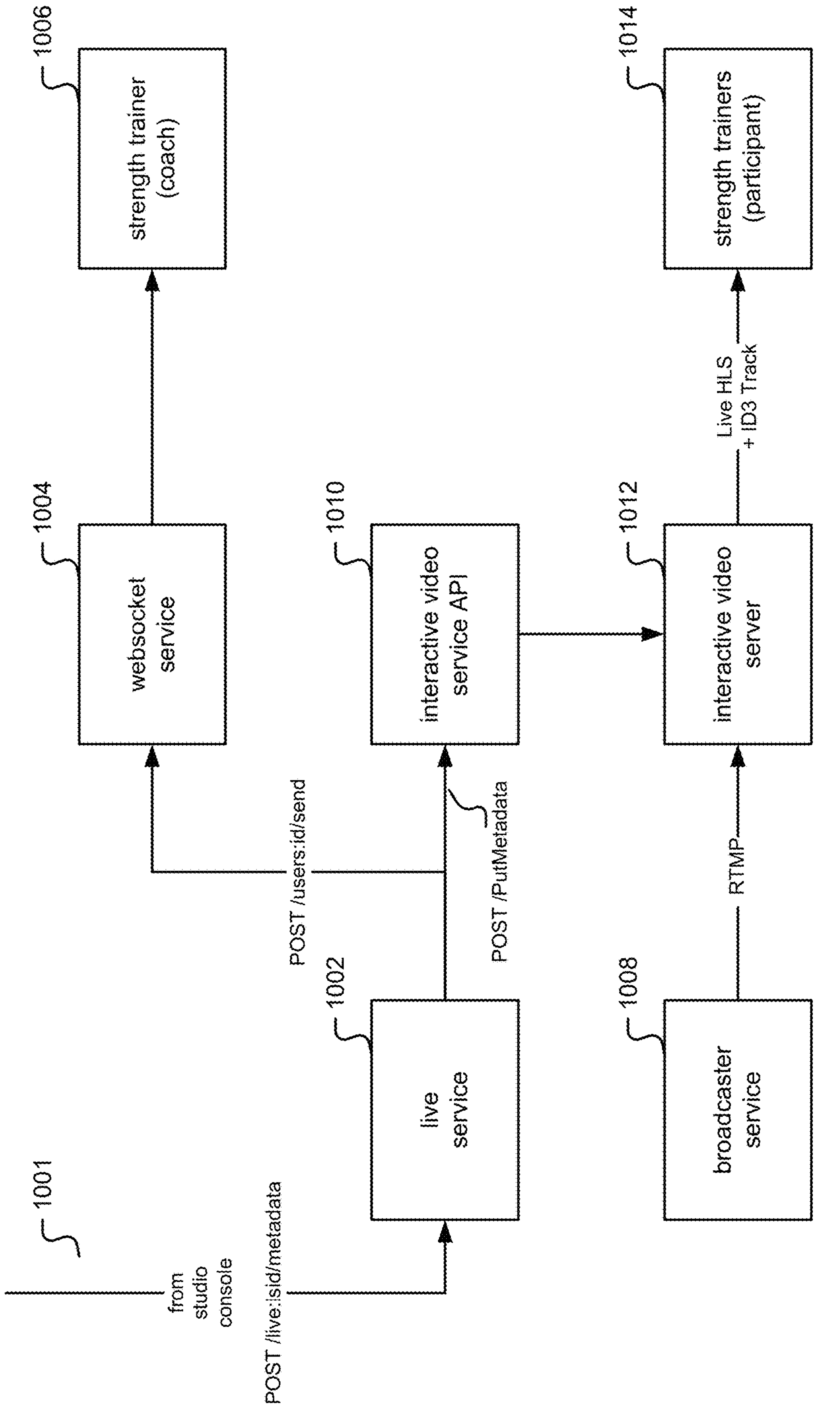
FIG. 10 illustrates an embodiment of a dataflow for livestreaming of workouts.

Live Workout Dataflow. FIG. 10 illustrates an embodiment of a dataflow for livestreaming of workouts. In one embodiment, the dataflow of FIG. 10 is carried out by the system of FIG. 9. In the example of FIG. 10, a studio console dataflow is shown.

Studio Mode. In one embodiment, livestreaming of workouts include a studio mode. A studio console (1001) may include a workout mode that allows for remote control, uses a timeline player, and can show 'fake weights'. Fake weights as referred to herein, are a technique whereby a coach is shown with realistic weights on-screen for a participant to observe, when the actual weights being exerted against the coach are lower, for example at 65% of what is shown. This allows a coach to demonstrate live an exercise safely at a perceived higher weight while still being able to speak clearly and without loss of breath.

As shown in the dataflow, studio console (1001) is coupled to a live service (1002) to feed metadata to at least two strength trainers such as those in FIG. 2A, one for the coach (1006) and one or more for participants (1014). In the example shown in FIG. 10, the studio console without limitation uses POST to couple with the live service (1002), for example POST/live:lsid/metadata. In the event a live workout was recorded and being repeated, an "encore" service (1002) may be used in place of the live service (1002), where an "encore" workout as referred to herein as any workout based at least in part on an original live stream with embedded metadata that is replayed to emulate in a way such that a participant strength trainer/client exercise machine interprets it as a live video stream with rewritten timestamps to make it seem live.

For example, the encore live workout may add a timestamp to transition from a video streaming service to a content delivery network. In one embodiment, the addition of the timestamp includes an addition of an epoch, such as a fixed timestamp, and embedding the timestamp in an HTTP Live Streaming (HLS) uniform resource locator (URL).

The encore workout is an improvement in that a live workout may be reused to encourage more participants who missed the original live workout.

The live service (1002) is coupled to a websocket service (1004) to transmit metadata to the coach's strength trainer (1006) while live. In the example shown in FIG. 10, the live service (1002) without limitation uses POST to couple with the websocket service (1004), for example POST/users:id/send.

In one embodiment, the websocket service (1004) delays the metadata pushed to the coach's strength trainer (1006) by a video-metadata duration and/or alignment delay. This alignment delay may be static and/or dynamic and is based at least in part on a video transcoding delay so that video is synchronized with metadata. For example, the video-metadata duration may be 1.5 seconds.

The live service (1002) or encore service (1002) is coupled to an interactive video service API (1010) to transmit metadata to the video livestream while live or in encore. In the example shown in FIG. 10, the live/encore service (1002) without limitation uses POST to couple with the interactive video service API (1010), for example POST/PutMetadata. An example without limitation of an interactive video service API (1010) is AWS IVS API. For an encore workout, an API related to a content delivery network (CDN) may be used instead of the interactive video service API (1010).

In one embodiment, a broadcaster service (1008) is used for video recording and/or live streaming the live coach, for example using OBS Studio. The video is transcoded and transmitted to interactive video server (1012) using a protocol, for example RTMP (Real-Time Messaging Protocol) as shown in FIG. 10. An example without limitation of an interactive video server (1012) is AWS IVS. In the case of an encore workout, a CDN may be used in place of the interactive video server (1012).

In one embodiment, the interactive video server (1012) and/or CDN (1012) is coupled to one or more participant strength trainers (1014) using a video and metadata protocol, for example HLS (HTTP Live Streaming) with a metadata track using an ID3 container.

Figure 11:
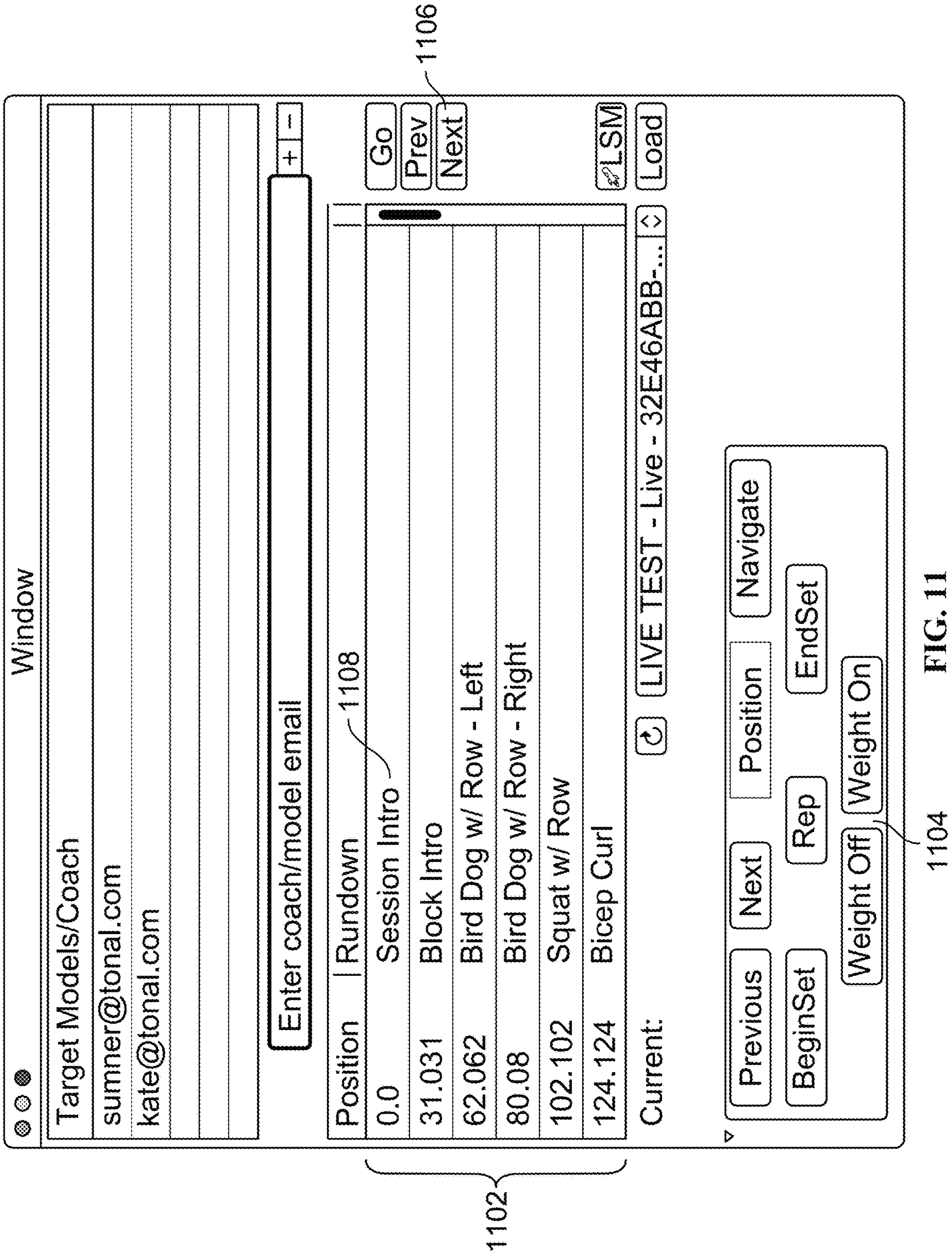
FIG. 11 illustrates an embodiment of a studio console.

FIG. 11 illustrates an embodiment of a studio console. In one embodiment, the studio console of FIG. 11 is referenced in FIG. 10 (1001). As shown in FIG. 11, the studio console includes a rundown describing a workout section group/portion of a workout (for example a squat or a bicep curl), a control for progression of studio mode, and a mechanism to push workout event metadata timings. In one embodiment, the studio console of FIG. 11 includes a table (1102) wherein each row corresponds to a section group/portion of a workout.

Live Trainer Mode. In one embodiment, livestreaming of workouts includes a live trainer mode. The live trainer mode may comprise a live mode on customer strength trainers using HLS streaming and/or may apply live metadata in real-time, including updates for all synchronized features. The live trainer mode may also comprise a Social Zone as described below.

Figure 12B:
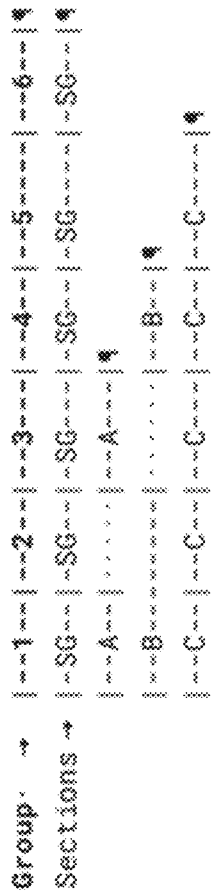
FIG. 12B is an illustration of an example of a shadow timeline.
Figure 12A:
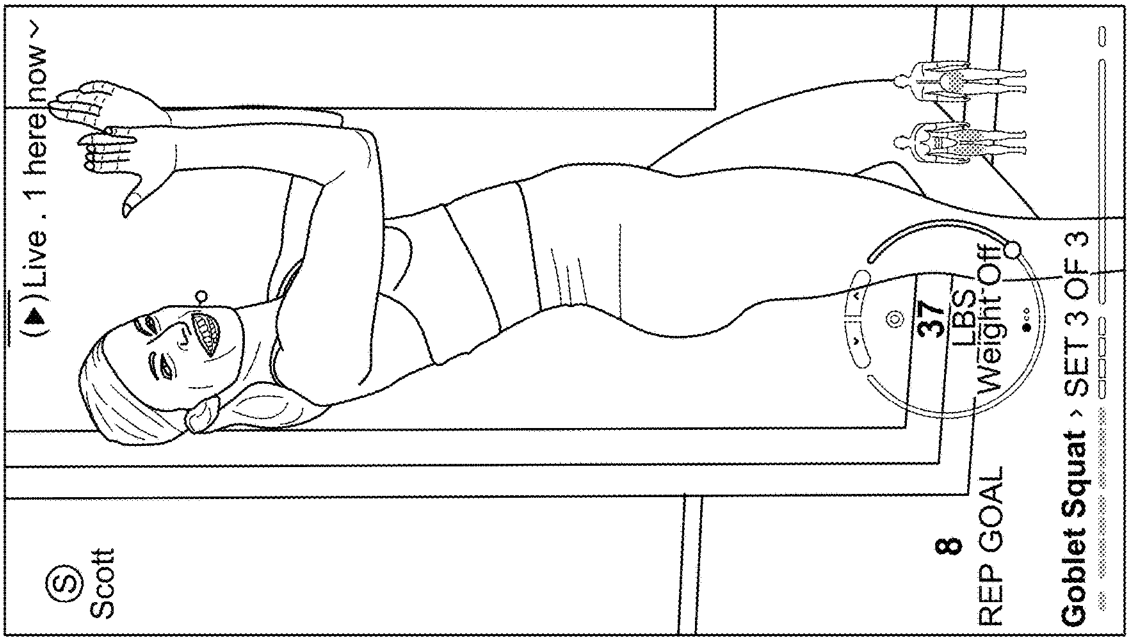
FIG. 12A illustrates an embodiment of an interface for live trainer mode.

FIG. 12A illustrates an embodiment of an interface for live trainer mode. A live trainer mode workflow associated with this interface of FIG. 12A includes the following steps in this or another order:

A workout is created using a content management system (CMS) or other service. The workout is marked as "live" with two dates; a VisibleAt indicating the date that the workout is visible for signups and a ScheduledAt indicating the date that the workout is scheduled for.

The trainer and/or studio creates the Studio Timeline and the Shadow Timeline. Each of those timelines plan event scheduling as shown for example in FIG. 3. The Studio Timeline is a coach-side timeline planned in advanced as a general schedule that, prior to the commencement of the live workout, the trainer plans to follow. The Shadow Timeline is a participant-side timeline planned in advanced that follows the Studio Timeline. Both the Studio Timeline and Shadow Timeline may be merged, updated, and/or synchronized during the live workout by the studio when the live coach advances, adds, alters, and/or removes an event sequence from the live workout.

Closer to the start of the live workout, the studio starts the studio console. An example of the studio console is shown in FIG. 11. A rundown table such as that shown in table (1102) of FIG. 11 is loaded from the Studio Timeline.

Coaches and/or models for the live workout may log into their trainer, such as the trainer in FIG. 2A. The studio console may then launch Studio Mode, which allows the coach's trainer to be partially and/or fully controlled by the studio, for example using fake weights (1104) in FIG. 11.

During the live workout, streaming is started to an interactive/live streaming service like (1012) in FIG. 10, for example using Amazon IVS.

As the coach/model works out, the studio console user/technician progresses the workout. For example, they may hit a "next" button (1106) of FIG. 11 in the console to go to the next workout/rundown event in the table (1102). The console thus progresses the Studio Mode and sends metadata for event transitions to the live streaming service (1012). For example in Amazon IVS, the Live Service platform may be used to send metadata. In a preferred embodiment, metadata is embedded into the stream itself to provide natural synchronization with the video/audio content in the stream.

The user joins a workout, either at the start or in the middle on their strength trainer, for example a trainer as shown in FIG. 2A. The user strength trainer receives the Shadow Timeline. Streaming video/audio/metadata content is received and is rendered on the user strength trainer.

Metadata that has been inserted into the stream by the studio/coach is applied to the Shadow Timeline. This may include advancing workout events, adding events, modifying events, and/or removing events. Metadata may also be used to bulk edit the timeline itself by modifying the entire table to reflect, for example, the table (1102) in FIG. 11. When a user enters a workout part way through, safety protocols are used to delay and/or ease the user into the workout regardless of the current workout event until the machine is suitably quiescent. For example, if the current workout is a bicep curl and the coach is halfway through the second set, the user may be given lower weight settings that slowly increase until the coach's suggested weight is reached, or the user may be asked to follow along without any weight until the next rep and/or opportunity to start is reached.

When the workout finishes, the stream is ended by the studio, and the user workout completes. In one embodiment, the end stream signal from the stream and/or streaming service itself is used to trigger the user strength trainer to complete/wrap up the workout.

Live Streaming Timeline. In one embodiment, the live streaming timeline techniques described in FIGS. 3-8 are adapted for live streaming. Delivering timelines and sections for live streaming is disclosed. When Video On Demand (VOD) platforms are used as described in FIGS. 3-8, timelines may be built alongside the video and audio to permit timings of sections to be known/calculated prior to starting a workout.

For live streaming, what sections that are needed may be known before the workout begins, but precisely where in the video stream they are to be placed may not be known ahead of time because of the spontaneous nature of a live stream. Delivering section timing information as the video is processed in real time is disclosed.

Overview. In one embodiment, the audio and video streams are delivered over a protocol such as HLS live streaming. This stream may be produced in a production studio such as that using (908) in FIG. 9. In order to track progression of the video with respect to the workout, metadata may be delivered either in-band, for example, via a track/part of the manifest, or out of band/under separate mechanism. This metadata may make reference to the shadow timeline produced at the start of the workout with the expected timeline sections minus their final timing.

A label "SectionEvent" may be used to describe a timing associated with a section. In one embodiment, upon receipt of the final metadata, the user/client/participant strength trainer composes the finalized SectionEvent, and inserts it into the tree to be processed at the appropriate video timecode. A SectionEvent may be a section plus start or end. The SectionEvent may allow the sections which have start and end to be decomposed into their edges which are delivered separately in a timeline.

Shadow Timeline. In one embodiment, a shadow timeline contains only black video and no audio timeline. For example, the black video may then be replaced by the live video stream, and the audio from the live stream may also be used. The sections may be placed in a way that all unique section edges are aligned. Durations may be either one second or in the case of sections where duration is used to drive behavior such as for a "thirty second curl session", durations may be preserved. This may affect a label "DurationGoal" where the section duration denotes the counter value, for example for a duration-based workout segment where the coach asks participants to do 45 seconds of all-out effort on bicep curls. Note that due to the spontaneous nature of a live workout, the final start and end timings of these sections may not yet be determined.

FIG. 12B is an illustration of an example of a shadow timeline. In the example shown in FIG. 12B, the shadow timeline includes section groups ("SG" in the FIG. 12B example shadow timeline). In this example, the "A," "B," and "C" refer to features to be executed that set various state parameters for the exercise machine for a given duration. For example, they may set the weight/resistance provided by the exercise machine at different points of the workout.

Shadow Timeline Creation. In one embodiment, a new section labeled "SectionGroup" is defined for every second of the timeline, or at any other timescale as appropriate, and has a unique UUID (universal unique identifier.) The start of SectionGroup may be used as an identifier for all SectionEvents whose edges, either start or end, match the SectionGroup. This means that in some embodiments there may be a SectionGroup section starting at the end of the shadow timeline to denote the remaining "end" SectionEvents.

Applying Shadow Timeline Sections. In one embodiment, the shadow timeline is pre-processed on the client, wherein the client includes the user/participant's training machine, to create a lookup table of SectionGroupID labels to sections. If a section contains the SectionGroup.Start time, then it may be included in that group. For the example shown in FIG. 12B, examples of the sections A, B, and C mapped to section groups:

SG1: [A,B,C]
SG2: [B,C] note: that B.Start was in the previous SG
SG3: [A,C]
SG4: [B,C]
SG5: [C]
SG6: [ ]

In one embodiment, when a new payload arrives, all the sections corresponding to a SectionGroupID are applied.

Payload Delivery. In one embodiment, workout features, for example trainer state behavior, are synchronized into the live stream which allows for dealing with latency issues. As one example, Amazon IVS has a "PutMetadata" facility that may be used to allow inserting ID3 tags in the chunks. In one embodiment, these are processed as a text track in an application layer media player such as ExoPlayer. Without limitation Amazon IVS is merely an example of a live streaming service provider that may be used, and the techniques described herein may be variously adapted to accommodate any other type of streaming service provider.

The following is an example of a payload to be delivered:

{"id"<uuid>, "o":<Fraction>} where "id" is the ID for the SectionGroup and "o" is an offset in real-time from the start of the SectionGroup, that is the offset from the first time a given SectionGroup ID was delivered. The first time the SectionGroup is seen this may be zero. For example, a payload may be {"id": "d2fc22c2-a3b4-4cce-a892-0a42192123a5", "o": "(15, 1)"}, Timers. Timers such as those associated with a DurationGoal session address when a participant joins a session midway through, for example with a bicep curl DurationGoal of 30 seconds, and a new participant joins 20 seconds into the session. That is, the timer may already be counting down other participants who started the DurationGoal session 20 seconds ago.

In one embodiment, a timer sections such as DurationGoal uses a Payload. Offset label for setting an initial offset from a prescribed duration. In the example above the Payload.Offset may be 20 seconds. Thus, in some embodiments, if a timer section prescribes 30 seconds from the initial offset, the client sets the timer to 30s minus the Payload. Offset and then counts down from there. In the example above that would give the new participant 30 seconds minus 20 seconds, or 10 seconds. The offset may not be needed after initialization, when the participant starts the next session with everyone else. A timer section may be contained within a single SectionGroup in order to support proper initialization when seeking to the middle of the section.

Delivery Options. Options for delivery of metadata may include in-band delivery, either delivered as part of the bitstream stream (e.g. text track or captions) and/or delivered with a manifest (e.g. SCTE markers). Another option for delivery of metadata is out of band, either delivered via websocket and/or delivered via polling.

In one embodiment, in-band delivery is preferred, as data may be inserted before it leaves the studio and may be guaranteed to arrive with the corresponding media. This also provides improvements such as safety benefits, as described below.

Live Streaming Timeline Details. In one embodiment, workout features are synchronized with displayed content that is played out over time. Different features may have different timings. These features and their timings are synchronized using the shadow timeline. The synchronized features may affect the state of the exercise machine.

When a workout is to be performed (for example, the workout is published prior to a live class), it may be roughly planned in terms of what is to occur within the context of the workout. For example, there may be a warmup, and the workout may proceed in the order that is specified. While what may occur in the workout is known, in a live streaming context, it may not be known precisely when various events may occur in time.

As opposed to the VOD examples described with FIGS. 3-8 where a video is created for the workout and the timeline techniques are known at production, in a live streaming context, the workout is known, and the pieces of the workout to be included in the live video are known, but instead of taking the video produced in the studio and tagging it with identifiers of what is occurring, for live workouts, as the video is streaming the studio indicates what is occurring in real-time.

In one embodiment, in order to facilitate such real-time tagging of live video as it is being generated, every possible event that may occur in a workout is given a unique index, which is what is referred to above as a "section group." Each section group may have a section group identifier. The section group indicates a set of features that are to be applied when in the section group of the workout. The features include those for determining a state of the exercise trainer during the section group of the workout. The features may be indexed by the corresponding unique identifier, for example in conjunction with the shadow timeline.

In one embodiment, referring to the example console of FIG. 11, at rundown table (1102) each row corresponds to a section group. As one example, referring to the example of FIG. 11, a producer in the studio selects "session intro" (1108) and hits "next" (1106) as the session progresses. This is registered by the live streaming service (1012) in FIG. 10, which in response sends the corresponding unique identifier, which may be preconfigured ahead of time for the section groups, to client workout machines participating in the live workout. The section group identifier is used as an index into the shadow timeline at an exercise machine, wherein the shadow timeline may be pre-generated and loaded on the participant exercise machines, to determine how it should change its trainer state to be synchronized with the live workout, for example according to the features included in a section group.

For example, if a section group identifier is sent to a participant exercise machine along with the corresponding portion of the video stream, the section group identifier may be used to drive the state of the participant exercise machine so that it is synchronized with what is being displayed/rendered on the exercise machine.

For example, when that section group identifier is received by a client exercise machine that is receiving the video stream, the client exercise machine may have an expanded lookup table that indicates what index corresponds to what set of state changes there should be for the workout. In one embodiment, the shadow timeline is the lookup table.

In one embodiment, preloading of information on the client device indicates, for each section group identifier, what set of exercise machine state changes are to be enacted. In this way, the client exercise machine may be improved to only require receiving a section group identifier via the video stream, which may then be used as an index into the pre-loaded lookup table and used to determine what exercise machine behavior state changes are to be executed.

That is, the trainer state may be remotely controlled/driven from the studio to be synchronized with the video stream by sending the section group identifier at the appropriate time during the live workout. The use of the preloaded shadow timeline at participant exercise machines, along with transmission of section group identifiers as a mechanism for controlling and synchronizing trainer state to the live workout video, is an improvement as it allows for handling a large amount of metadata arbitrarily without having to include all of it in the livestream as it is being distributed.

In one embodiment, in the studio there is a producer who is watching the coach in real time, and via a console such as that shown in FIG. 11, indicates, in real-time, what section group of the workout is being initiated. This causes the section group identifier to be sent along with the video stream as it is being generated. The section group identifier may be delivered out of band or in band with the video stream.

In one embodiment, the section group identifier is delivered on a separate path from the video stream as an example of out of band delivery, and synchronization between the section group identifier which controls the state of the trainer and the video stream may be implemented using a timecode. For example, the section group to apply, which may be indicated via its corresponding section group identifier, may be transmitted to a participant exercise trainer with a timecode indicating when to apply the section group. The section group identifier and the timecode indicating when to apply the section group may be sent out of band from the video. When the playback of the video at the exercise machine reaches the point indicated by the timecode, the appropriate trainer state is implemented for the corresponding section group identifier.

In one embodiment, the section group identifier is injected or embedded into the video stream that is also being produced in real-time as an example of in band delivery. The section group identifier, which may control the behavior of a local client exercise machine, is thus received in a manner where it is synchronized with the appropriate corresponding portion or chunk of the live video stream. That is, when the video chunks are received by a client workout machine, the appropriate section group identifier is embedded as described above, for example with Amazon IVS.

The embedding of the section group identifier provides various improvements. One example benefit is to reduce latency and to enhance synchronization. In this example, a small amount of data, the index-section group identifier, is injected into the video itself. The embedding of the section group identifier in-band with the video stream also provides various safety improvements, such as resiliency against loss of the section group identifier.

For example, if the exercise machine control metadata, for example section group identifier used to control the state of the exercise machine, is transmitted asynchronously from the video stream by using different delivery path and the control metadata were lost, there may be a mismatch between what the video is showing to the user and the state of the exercise machine, potentially resulting in a dangerous situation. For example, as described above, the section group identifier is used by the client exercise machine to set its state. One example of the state that is automatically set by the exercise machine is the amount of resistance or weight provided by the strength trainer for an exercise.

Furthering the example, the workout may be progressing from a bench press to a fly movement. The fly movement is typically difficult, so the weight/resistance provided by the exercise machine, an example of the state of the exercise machine that may be controlled, is set low, and would be lower than what is set for the bench press. Suppose that the coach switches to performing the fly, but the metadata for the fly that should be sent to the client so that it can automatically change the resistance to the appropriate weight for the fly movement is lost. If the section group identifier for the fly is lost, the client exercise machine has not been informed that the workout has progressed to a fly movement, and thus does not know to reduce the amount of resistance appropriately. However, the video, sent via the separate delivery path, may be showing that the live workout has moved onto the fly, with the user also moving into position for the fly at home. In this example, the weight for the bench press is still being applied by the exercise machine, and the user would be attempting to perform the fly with the heaver weight of the bench press, rather than the lower weight that should have been automatically applied by the exercise machine had the metadata/section group identifier indicating that the coach had switched to the next movement been successfully delivered to the exercise machine. This may result in a dangerous situation for the user.

Such situations may be avoided more, and more resiliency may be provided, by delivering the exercise machine control metadata in-band with the live stream. Here, the driving of the state of the strength trainer is synchronized with the video stream via the section group identifiers and shadow timeline described herein. In this way, the video may not be received without the proper trainer state control information, including the section group identifier. Resilience and/or reliability may also be added by adding error detection and control overhead to the control metadata such as channel coding, for example using a repetition code that continually/frequently sends the current section group identifier.

In one embodiment, the larger piece of metadata that is indexed, for example via section group identifiers, at a participant exercise machine is the shadow timeline. The shadow timeline may include events that may occur in a workout, but with shadow timings, as the duration of how long some features should be on or not is not known prior to the live workout context.

In one embodiment, a shadow timeline is sent to the client along with section groups. The shadow timeline may be produced at the start of the workout with the expected timeline sections minus their final timing. The shadow timeline may be sent to participant exercise machines at the start of the workout. The client strength trainer, during the workout, may then perform a lookup of the shadow timeline using the section group identifiers that are embedded in the video stream being received.

For example, referring to the example shadow timeline in FIG. 12B, the client exercise machine receives the identifier for section group 1. This section group identifier may be injected into the video chunk via the studio console in response to the producer having indicated that the corresponding section group was starting. After extracting the identifier from the chunk of the video stream that was received, the client exercise machine then uses the extracted section group identifier to perform a lookup of the shadow timeline to determine parameters for what the trainer state should be. For example, the lookup may determine that A B and C should be applied when the identifier for section group 1 (SG1) is received.

As shown in FIG. 12B, the shadow timeline includes section groups with corresponding section group identifiers. As described above, the section group does not necessarily have a known duration as it may depend on the spontaneity of the coach during the dynamic/live workout. The section group indicates what state the trainer should be in for that section group, for example substate A, substate B, and/or substate C.

For live streaming, each section group may have a corresponding section group identifier. During the live workout, as the coach moves from one section group to another, the appropriate section group identifier is embedded in the video stream. The embedding of the metadata for controlling the trainer in band with the video provides synchronization between what is displayed on the client exercise machine and the state of the exercise machine. For example, the exercise machine sets the weight appropriately given what is being displayed, so that the appropriate text is displayed in the UI given what video is being displayed.

Furthermore, sending of a shadow timeline to the client exercise machine beforehand or at the start of a workout provides an improvement with a reduction in the amount network traffic during the live workout, as the control information that is provided to the exercise machine for driving the state of the exercise machine is minimized to the section group identifier, where the exercise machine client then uses the section group identifier to perform a lookup of the local shadow timeline to determine the appropriate trainer state.

Differing behavior between local and remote trainers. As described above, the behavior and state of remote client exercise machines of live workout participants may be driven from a studio console such as that shown in the example of FIG. 11. In some embodiments the studio console also drives the "local" exercise machine in the studio, where the local machine is described herein as the machine that the coach is using, whether in the same room/building/community or not. In one embodiment, the studio exercise machine is driven in a different manner from the remote client exercise machines of the live workout participants that may be in the homes of the participants.

For example, the remote exercise machines display a video of the coach. However, the coach may not see a video of themselves at the same time. In some embodiments, when the producer uses the studio console and selects a row of portion (1102) of FIG. 11, the state of the local/coach exercise machine is also driven. In one embodiment, the local machines may be driven through a different mechanism as compared to remote/participant exercise machines).

The studio mode allows the coach to receive realistic weights via the studio exercise machine so that they may perform the exercises during the workout while simultaneously concentrating on and/or verbally articulating the workout. In one embodiment, while the suggested weight for the coach is shown on the studio exercise machine which may be visible in the video stream so that participants can view the coach using the studio exercise machine, the actual weight or resistance provided by the exercise machine may be a fraction of the suggested weight. For example, this fake weight may be 65% of the suggested weight. This allows the coach to perform the exercise, but also be able to speak to and provide instruction to the participants.

In one embodiment, the exercise machine that the live coach uses receives its own version of a timeline, referred to herein/above as a "studio timeline" or "coach timeline". There may be a remote control and/or studio console that progresses through the "next" button (1106) to progress through the workout.

In one embodiment, the coach's timeline/studio timeline is an infinite loop. For example, the timeline may stay on a movement until the coach decides to move on to the next movement of the workout. As the coach is conducting the live workout and talking to participants and progressing through the workout, the studio producer may also progress the workout via the studio console based on cues from the coach.

In one embodiment, the coach's timeline is generated so that the coach need not touch the screen of the exercise machine to progress through the workout. This improvement allows the coach the freedom not to interact with the touchscreen so they can instead focus on camera performance. The coach may do whatever they would like during the live workout, with the producer in the studio using the studio console to drive not only participants' exercise machines, but also the coach's exercise machine in a way that minimizes the amount of interaction required by the coach, and that allows for the workout to proceed even if the coach is not performing the workout in the same way as the participants should be. An example of this is when a coach stops after doing a small number of reps to talk to the participants, but the participants are doing the full number of reps for the set remotely and/or at home.

In one embodiment, the studio may include the coach exercise machine as well as participant exercise machines, where the studio console drives the state of the coach and participant exercise machines, wherein the state of the coach exercise machine and the state of a participant exercise machine may be driven differently. In this way, the trainer state of multiple exercise machines may be controlled and synchronized for the live workout.

Social Zone. In one embodiment, a "social zone" as referred to herein generally is where a user such as a participant of a live class using an exercise machine interacts with their fellow athletes throughout the course of the workout. In one embodiment, when users get personal records (PRs), milestones, or other achievements in the middle of a workout, they show up in their social zone, for example at the top of their display (206) in FIG. 2A.

In one embodiment, for more special moments or higher importance moments, such as a user hitting their 100th workout or their 10th week streak, the producer in the studio triggers the shoutout to occur at a certain time in the workout as the coach gives the user a shoutout, and at that time the user's avatar and username will pop up on other athlete's social zones for them to further encourage the user.

Live workouts may include a social zone. A social zone as referred to herein is an interface to a community network allowing participants to socialize/communicate with the coach, studio, and/or other participants. It may comprise shoutouts, live participant statistics, achievements, cheers, and/or milestones. The social zone prioritizes importance and/or recency to clearly communicate to an active participant as they are primarily focused on exertion and/or the screen real estate that a participant's exercise machine may be relatively small. As referred to herein, "importance" comprises a prioritized level of import to any relevant shoutout for a given user/participant such as achievements, milestones, PR, special days, and/or cheers, wherein a milestone may be higher level than a cheer, or a cheer from a coach may be higher level than a cheer from a peer/participant. A participant may send a cheer or other shoutout to another participant, for example using a web socket service (1004) in FIG. 10. A special day may include a birthday, anniversary, and/or holiday. As referred to herein, "recency" comprises a prioritized level of relative time, wherein a more recent activity may be higher level than a less recent activity.

Shoutouts. In traditional in-person boutique fitness classes at a gym, coaches regularly communicate with participants. Coaches and/or participants may greet old friends. Coaches and/or participants may give form tips when people get sloppy. Coaches and/or participants may give encouragement when others are struggling. Shoutouts are intended to re-create as much of the social communication/dimension as possible in live streaming classes by having coaches and/or participants communicate directly with participants who join classes.

As an improvement over traditional in-person boutique fitness classes, the entire history of every member in the class may be instantly looked up/tracked, so that participants are forgotten/biased less over traditional classes. If a participant is hitting a milestone, celebrating a special day, or doing something new on an exercise machine such as the strength trainer in FIG. 2A, that may be mentioned to give the feeling that the coach and platform know and care about members.

Figure 13:
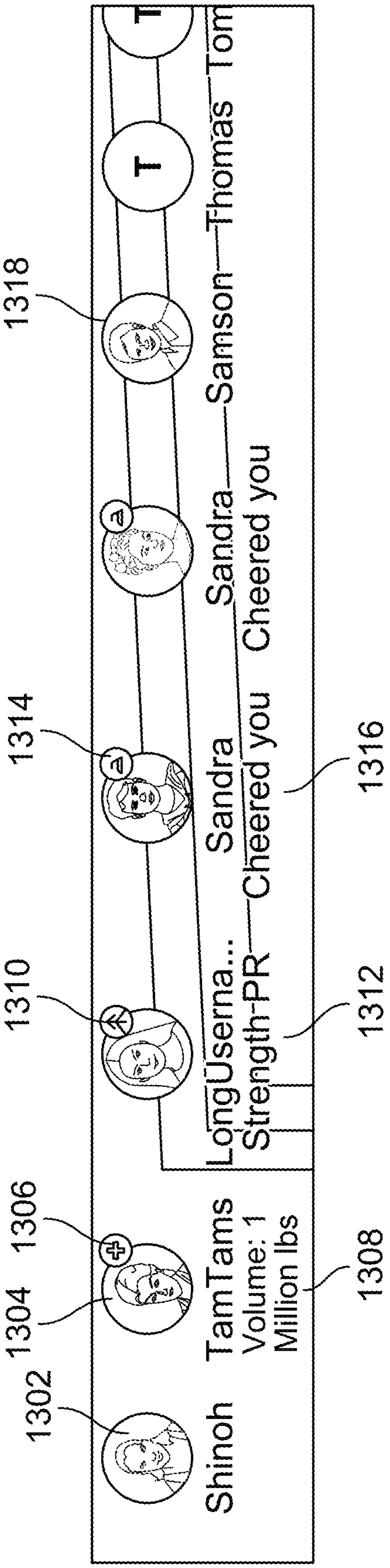
FIG. 13 illustrates an embodiment of a social zone interface.

FIG. 13 illustrates an embodiment of a social zone interface. In one embodiment, the social zone interface is shown on the display (206) of the strength trainer/exercise machine of FIG. 2. In one embodiment, the social zone interface is an embodiment of the display shown in FIG. 6D.

User (1302), in FIG. 13 as "Shinoh", is displayed in the social zone. User (1302) has several peers shown as a collection of avatars in a prioritized order based at least in part on importance and/or recency, wherein in FIG. 13 the prioritized order of avatars is: TamTams (highest priority), LongUsername, Sandra (male), Sandra (female), Samson, Thomas, and then Tom (lowest priority). As referred to herein, a "shoutout" is any notification associated with any avatar in the social zone of FIG. 13. For example in FIG. 13, Shinoh has shoutouts from peers TamTams, LongUsername, Sandra, Sandra, Samson, Thomas, and Tom. Note that a shoutout relationship is not necessarily symmetrical; Shinoh may have a different set of shoutouts on their social zone of FIG. 13 than TamTams might on their own social zone.

The social zone avatar priority order is dynamic based on importance and/or recency changing during a rep, set, and/or workout. For example, during a workout the avatars shown in FIG. 13 may shift left and right depending on decay or advancement. In one embodiment, a decay curve is set on shoutouts and/or shoutout category/type to affect importance and/or recency, wherein the decay curve may be conceptualized as a curve drawn on an x-y axis with the y-axis decaying importance by a decay factor between 1.0 and 0.0, and the x-axis referencing time units. The decay curve thus decays importance based on recency. As time progresses, a decay curve expires a given shoutout based on category priorities by being multiplied by the decay factor for a given point of time in the curve. Some shoutouts stay up longer than others, for example, a milestone such as lifetime volume exceeding a million rep-pounds may be assigned a slower or more moderated decay curve than that of a cheer from another participant.

As shown in FIG. 13, the shoutout from TamTams (1304) has a badge (1306). Badges as referred to herein are an icon indicating the category of shoutout. In the case of FIG. 13, badge (1306) shows a plus sign indicating an achievement, which is further detailed with milestone detail text "Volume: 1 Million lbs" (1308). The shoutout from LongUsername also has a badge (1310), in this example an arrow indicating a PR, which is further detailed with PR detail text "Strength PR" (1312). For example, LongUsername may have exerted their highest weight ever with a bench press. The shoutout from Sandra also has a badge (1314), in this example a muscled arm indicating a cheer, which is further detailed with cheer detail text "Cheered you" (1316.) As shown in FIG. 13, after some delay, the decay curve may include a removal of any badge or detail text as shown with Samson (1318) who is still relatively high in avatar priority order, but no badge or detail text is shown after some delay/decay.

In one embodiment, when a shoutout has a very high priority, like a million pounds achievement (1306) which is once in a lifetime, even as new shoutouts come in, they may be slotted in lower than that million pounds achievement (1306) shoutout. In one embodiment, an absolute priority is sent out, gets set and deprecation is based on real clock time to arrive at an arrangement or priority order.

Figure 14:
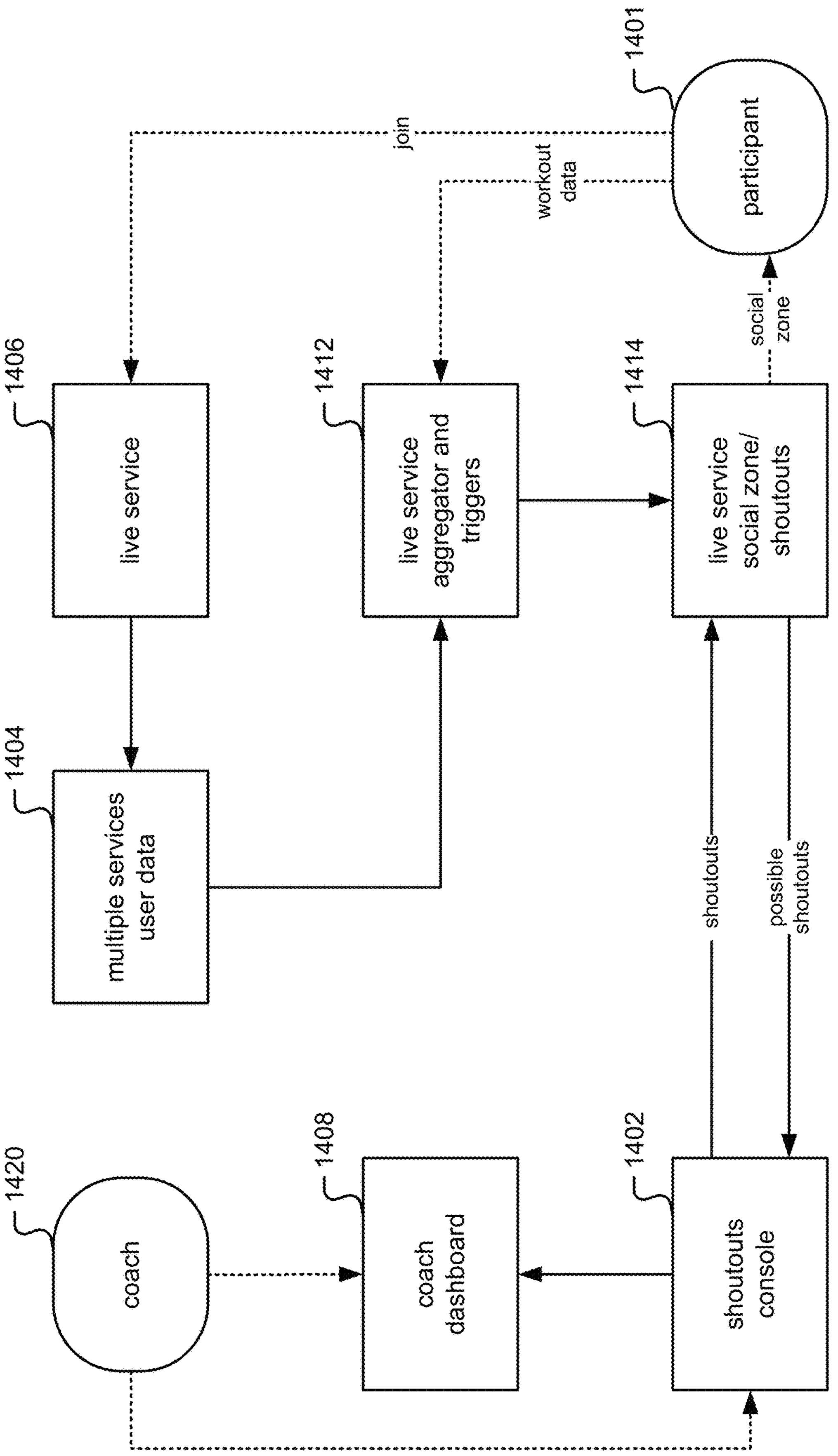
FIG. 14 illustrates an embodiment of a social zone dataflow/system.

FIG. 14 illustrates an embodiment of a social zone dataflow/system. In one embodiment, FIG. 14 is an example backend implementation. In one embodiment, the dataflow/system of FIG. 14 is carried out by a server affiliated with the studio console (908) of FIG. 9.

As described above, shoutouts are something a coach may recognize and may even say out loud during the workout about one or more participants. In one embodiment, for a backend context a shoutout refers to herein to any live participant achievement whether it is recognized by a coach or not. Some shoutouts may be placed directly in the social zone of FIG. 13 and may or may not receive coach recognition. As described herein, anything inserted into the social zone of FIG. 13 is a social zone activity, which may also be a shoutout.

Workflow. As shown in FIG. 14, there are several workflows including join, aggregation, and shoutout distribution.

Join: In one embodiment, a participant's (1401) user data, comprising workout plus personal data such as birthdays, are gathered and cached on a live service (1406). Some data (1404) such as major volume milestones are predicted to possibly take placed during the workout and a set of expected suggested weights are prepared. As described herein, a "suggested weight" is an appropriate weight/resistance for a user's set that a strength trainer/exercise machine automatically determines based at least in part on user data as described in U.S. patent application Ser. No. 17/700,462 entitled EXERCISE MACHINE SUGGESTED WEIGHTS filed Mar. 21, 2022 which is incorporated herein by reference for all purposes. Other major milestones such as anniversaries, $n^{th}$ workout, or birthday may be detected immediately and added to the possible shoutouts for the workout (1412) as possible live service triggers.

Aggregation: In one embodiment, as a participant (1401) works out, metrics are aggregated from the workout data (1412). This may include both in-workout milestones such as volume in the workout and all-time metrics in the community such as volume milestones. Upon aggregation of new data, the metrics may be checked to see if they have triggered a milestone. When a trigger is exceeded, a potential shoutout (1414) may be created.

Shoutout Distribution: In one embodiment, potential shoutouts (1414) take two separate paths through the live social system. A first path may be immediately inserted into the social zone and distributed to all the participants as shown in the example of FIG. 13. A second path may be sent to a shoutouts console (1402) in the studio. These second path items may then be further curated by a producer and shown to the coach (1420) via for example a coach dashboard (1408) for shouting out. Once the coach shouts out the participant, the producer may acknowledge it which triggers insertion into a social zone as shown in FIG. 13.

Social Zone Ordering. In one embodiment, the social zone reorders to put newer activities first, for example the left-most slots in the example of FIG. 13. However, different types of social zone activities may have different levels of importance. Shoutouts for major milestones such as a volume milestone of one million pounds of weight lifted in aggregate by a user may have a higher priority than more common shoutouts such as strength PRs.

In one embodiment, in order to handle both importance and recency, social zone activities are sorted. As one example, the social zone activities are sorted by a timestamp such as a Unix timestamp, where the higher the number the higher it appears in the social zone. For more important activities, a static extra amount of time may be added to the activity to cause it to possibly sort higher than more recent but less important activities. As time proceeds, these important activities may eventually be superseded by more recent activities. While examples involving timestamps are described above for illustrative purposes, other types of values may be used to indicate importance and recency for sorting social zone activities such as decay curves.

In one embodiment, in addition to the global social zone, individual users may also have interspersed personalized "cheers" or claps from fellow participants and/or the coach. These may also be ranked using the same timestamp and importance as for global activities, but are mixed into the global social zone list for each individual where, for example, the largest timestamp between the global social zone and the personalized list is used for final ordering.

Shoutouts. In one embodiment, a user's workout activity and achievements are kept track of in a database. Coaches may make verbal shoutouts about recent or upcoming achievements or noteworthy stats about the users, such as a birthday/anniversary, in a live workout. In one embodiment, a "cutout" or shareable snippet of the video stream may be made available to a user receiving a shoutout, such as a coach shouting out a user for their birthday, which the user may download and/or share.

Shoutout Model. The following is an example of a Shoutout Model in pseudo-code:

```
type Shoutout struct {
    ID                      uuid.UUID
    CreatedAt               time.Time
    UpdatedAt               time.Time
    DeletedAt               gorm.DeletedAt
    UserID                  uuid.UUID
    LiveSessionID           uuid.UUID
    Type                    SocialZoneActivityType
    Description             string
    ShortDescription        string
    Priority                int
    WorkoutSetID            *uuid.UUID
    MovementName            string
    Score                   float64
    Mentioned               bool
    Category                ShoutoutCategory
    SentToParticipants      bool
    IsGroup                 bool
    LiveParticipant         *LiveParticipant
    CoachMentionCount       int
}
```

Shoutout Categories. Example categories of shoutouts for live workouts include: User and Live. User shoutouts include events that have been pre-calculated based on existing data or events based on specific info about the user such as a birthday or anniversary of some event. Live shoutouts include events that have happened within the live workout. These include events such as PRs or reaching a certain total time under tension threshold.

Within the Live category, there are at least two kinds of shoutouts: individual and group. For example, a single user may receive a shoutout for achieving 2 PRs in the last set but the live workout group as a whole may also receive another shoutout for having 10 PRs overall.

Social Zone Activity Types. In one embodiment, each one of the below example social zone activity types has a different priority, (for example, in seconds using the static extra time described above) that are added to the timestamp score if a user qualifies for/triggers one of the events. These types may be shared between shoutouts and social zone activities. The types may also determine the visual icon shown on the social zone UI as shown in FIG. 13.

One example order from highest priority to lowest priority include:

VolumeMilestone
StreakMilestone
WorkoutMilestone
WorkoutCount
Anniversary
Birthday.
ReactionClap
GroupPR
PR
Joined (which may not be shown in the social zone UI but the coach/trainer social zone UI)

These priorities may determine how the social zone users are sorted in the trainer UI and how they are sorted in the producer shoutouts console.

Figure 15:
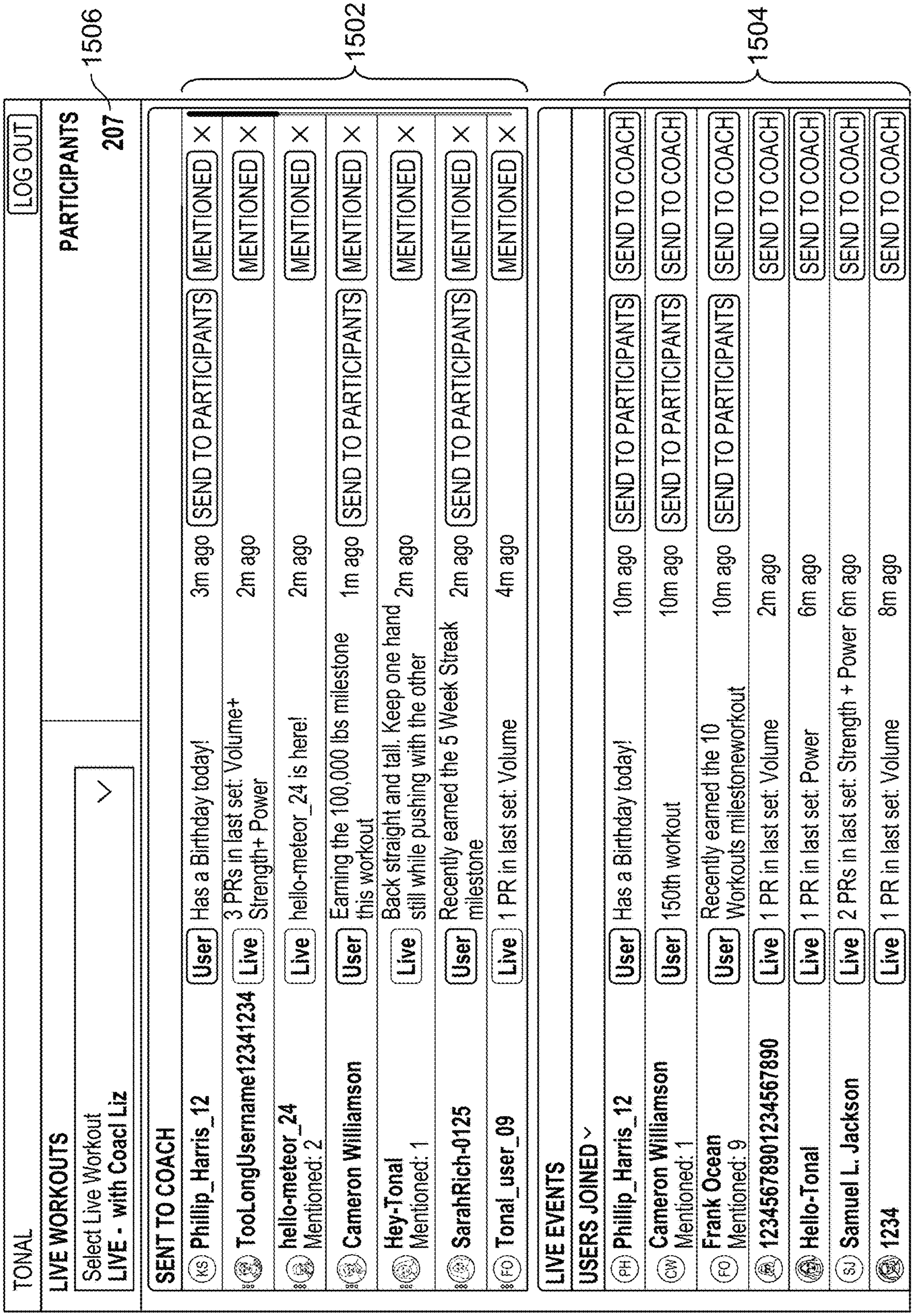
FIG. 15 illustrates an embodiment of a shoutouts console.

Coach Mentions. FIG. 15 illustrates an embodiment of a shoutouts console. In one embodiment, the shoutouts console is shown as (1402) in FIG. 14 and/or may be controlled by the producer in studio.

The shoutouts console may include an in-studio application that collects live participant stats (1506). There may be priority/rollups for shout-outs. The prioritization may be performed according to the social zone ordering described above. The console of FIG. 15 may posts live shoutouts (1504), and live shoutouts may appear in the coach's social zone on-trainer. The producer may also control of what a coach sees and/or is sent (1502).

In one embodiment, shoutouts may also be marked as mentioned (1502) by the coach and/or verbally via the producer shoutouts console (1402). These mentioned shoutouts may be kept track of in a table coach_mentions, an example of which is provided below in pseudo-code:

```
type CoachMention struct {
    ID              uuid.UUID
    CreatedAt       time.Time
    UpdatedAt       time.Time
    DeletedAt       gorm.DeletedAt
    ShoutoutID      uuid.UUID
    LiveSessionID   uuid.UUID
    UserID          uuid.UUID
    Nickname        string
    Description     string
    Score           float64
}
```

Shoutouts Flow. In one embodiment, when a user joins a live workout, logic is initiated that aggregates the user's data to check for shoutout-worthy events. Examples of user shoutouts that are looked or searched for include, for example:

- Recent Milestones (e.g., within the last 7 days);
- Upcoming Milestones, using +1 logic as described below;
- Birthday; and/or
- Anniversary The following are examples of +1 logic for upcoming milestones which aid in triggering future shoutouts:

- Workout milestones: +1 to current total workout count;
- Streak milestones: +1 to current streak, for example only if this is the first workout of the week; and/or
- Volume milestones: +estimated workout volume to current total volume, which may be estimated based on suggested weights for each participant.

In one embodiment, when a user ends a set in a live workout, any significant events are checked for again. Examples of live shoutouts that are checked for include for example:

- PRs, both individual and group;
- Form feedback, for individual (private) and group (public);
- Reaching a volume milestone;
- Every 1000 reps; and/or
- Every 10 hours of time under tension.

As referred to herein, "form feedback" is feedback on one or more participants' exercise form while performing a rep. A coach (1420) may observe a participant's (1401) form indirectly using metrics generated by the machine telemetry/sensors, such as an imbalance between a left and right grip, or directly using a machine's camera. For example, an example of form feedback after a coach's observation may be "Hey-Tonal, please keep your back straight and tall. Keep one hand still while pushing with the other." The improvement of providing personalized form feedback outside of an in-person boutique club experience includes the reduction of resources needed to transport a user to a gym, the lowering of exposure such as virus exposure to a user at a gym, and/or an increase of user participation in healthful physical activity because of the convenience of working out at home.

In one embodiment, aggregated group counts of PRs and form feedback per set are kept on two tables, live_group_prs and live_group_form_feedbacks, examples of which are provided below in pseudo-code:

```
type LiveGroupFormFeedback struct {
    LiveSessionID       uuid.UUID
    WorkoutSetID        uuid.UUID
    TriggerID           uuid.UUID
    Feedback            string    // "Lower your arms slower"
    ParticipantCount    int
}
type LiveGroupPr struct {
    LiveSessionID       uuid.UUID
    WorkoutSetID        uuid.UUID
    PrType              string    // Strength, Power, Volume
    ParticipantCount    int
}
```

In one embodiment, each of the live participants' workout end set messages updates the participant count field if the participant had a PR/Form Feedback in the last set.

In one embodiment, a user's initial total volume, such as the total volume at start of live workout, and current total volume, including any volume done in the live workout, are also saved on a live_participant_stats table in the live service and used to track any volume related events. An example of this table in pseudo-code is:

```
type LiveParticipantStats struct {
    LiveSessionID                uuid.UUID
    UserID                       uuid.UUID
    CreatedAt                    time.Time
    UpdatedAt                    time.Time
    DeletedAt                    gorm.DeletedAt
    CurrentTotalVolume           float64
    NextVolumeMilestoneValue     int
    InitialTotalVolume           int
}
```

Shoutouts API. The following is one embodiment of an application programming interface (API) for shoutouts.

[GET]/live/{liveSessionId}/shoutouts

- Returns list of shoutouts for the given live session
- Optional query param type to filter the view by SocialZoneActivityType
- Excludes shoutouts from users who have left the workout
- Excludes shoutouts that have been marked as mentioned by coach (on producer shoutouts console)

[POST]/live/{id}/coach-mentions

Figure 16:
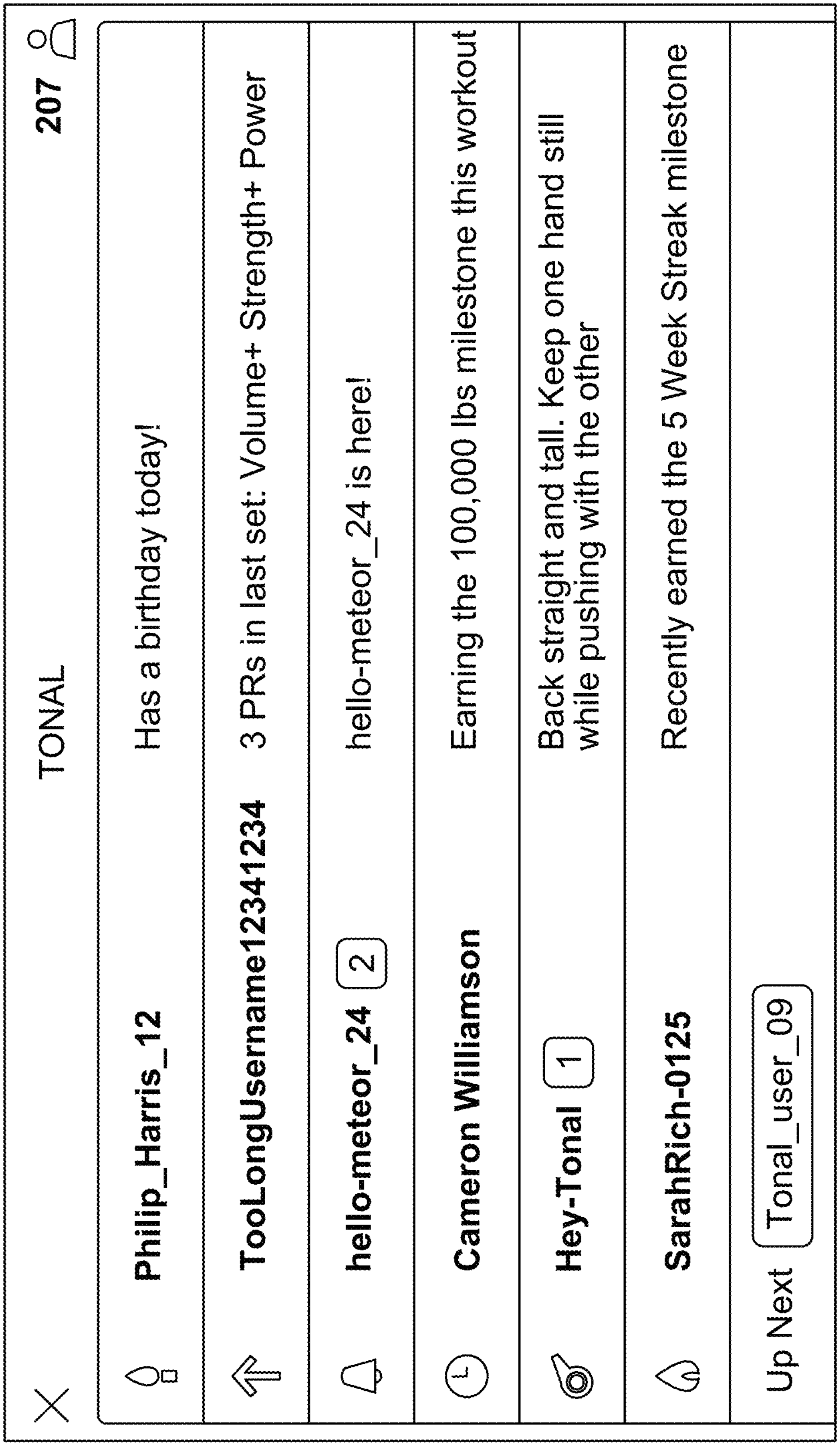
FIG. 16 illustrates an embodiment of a coach dashboard.

- Shoutout model as request body
- Updates shoutoutMentioned bool to true
- Creates a coach_mention record FIG. 16 illustrates an embodiment of a coach dashboard. In one embodiment, the coach dashboard is shown on display (206) of FIG. 2A for the coach's strength training machine, which may be made larger than a participant's display. In one embodiment, the coach dashboard of FIG. 16 includes an in-studio application such as that shown in FIG. 15, a large format for television/projector viewing; an earpiece for hearing producer verbal comments; and/or producer controls such as those shown in the shoutout console (1402) from FIG. 14 and/or FIG. 15.

In one embodiment, a live VOD experience is provided. In some embodiments, the live VOD experience includes that a workout may be published as VOD, for example as an encore experience, for example using encore server (1002) of FIG. 10. The VOD may be similar to on-demand content and/or may include time-flex as described above. In one embodiment, such a workflow starts after the live tech workflow as shown in FIG. 14.

In one embodiment, live chat is provided which may include:

- live chat shown in a waiting room/social room prior to the workout, and elsewhere;
- users may participate using the mobile app and/or from the strength trainer/exercise machine; and/or.
- a moderation tool so that the producer/coach may monitor chat and may block messages.

In one embodiment, live feed radio sync is provided, for example through FM radio. Live feed FM sync may include:

- Users are put in-sync with the studio; and/or
- Feed-FM Simulcast

Social Zone. In one embodiment, the social zone is implemented as a redis zset per studio live session. As one example: Key: liveSessionId, Member: userId, value: unix timestamp/score. While examples involving the use of a redis zset are described below for illustrative purposes without limitation, that described herein may be variously adapted to accommodate any other type of database implementation as appropriate. In one embodiment, scores are defined by the timestamp that the event occurred +an offset based on the priority/weight of the event, as described above.

As one example, on the trainer UI as shown in FIG. 16 the redis zset is rendered as a list of social zone entries, which is an aggregation of a redis zset score, LiveParticipant data, a SocialZoneActivity. In one embodiment, when a user joins the live workout, they are assigned a default value/score in redis matching the timestamp that they joined the workout. In one embodiment, depending on events/shoutouts that a user may trigger during the workout, scores update and re-sort the order of the social zone. In one embodiment, the producer shoutouts console as shown in FIG. 15 may also manually add events into the social zone as the coach mentions them verbally.

Social Zone Entry Model. The following is an example of a social zone entry model in pseudo-code:

```
type SocialZoneEntry struct {
    UserID          uuid.UUID
    Nickname        string
    AvatarURL       string
    Score           float64
    IsSelf          bool
    IsFollowing     bool
    Gender          string
    DateOfBirth     *models.Date
    Location        string
    Activity        *SocialZoneActivity
}
```

In one embodiment, user information such as nickname and avatar URL (uniform resource locator) come from the live participants table on the live service. Score may come from the redis zset.

Social Zone Activity Model. The following is an example of a social zone activity model in pseudo-code:

```
type SocialZoneActivity struct {
    ID              uuid.UUID
    CreatedAt       time.Time
    UpdatedAt       time.Time
    DeletedAt       gorm.DeletedAt
    UserID          uuid.UUID
    LiveSessionID   uuid.UUID
```

-continued

```
    Type            SocialZoneActivityType
    Description     string
    IsLatest        bool
}
```

In one embodiment, a social zone activity is created and stored on the database each time a user triggers an event. These may also be manually created through the producer shoutouts console as shown in FIG. 15.

Social Zone Reactions. In one embodiment, users are able to send reactions to each other during a live workout. These may be kept track of in a table such as this example in pseudo-code:

```
type SocialZoneReaction struct {
    ID              uuid.UUID
    CreatedAt       time.Time
    UpdatedAt       time.Time
    DeletedAt       gorm.DeletedAt
    LiveSessionID   uuid.UUID
    UserID          uuid.UUID       // Reaction recipient
    SenderID        uuid.UUID
    Score           float64
}
```

Social Zone Flow. The following are example details for a social zone flow:

- On join, some user data is collected for shoutouts and user is inserted into the zset with current timestamp;
- During the live workout, the trainers poll the get endpoint for the social zone every 5 s between sets (or any other frequency as appropriate). Polling may be paused while the user is actively in a set;
- On the workout end set message, the live service (1406) checks for any PRs, form feedback and/or milestones that occurred in the last set and creates new shoutouts for these events;
- Individual PRs and milestones are automatically inserted into the redis zset with a weighted timestamp, such as the current timestamp+priority based offset in seconds described above; and/or
- At any time during a live workout, a participant may tap on another user's bubble in the social zone on their trainer's display (206) and/or a mobile app, and send them cheers. This may be reserved to when a sending participant and/or receiving participant is no longer exerting themselves to reduce distraction.

Social Zone API. The following are embodiments of a social zone API.

[GET]/live/{liveSessionId}/social-zone-activities

- Returns list of social zone entries for all participants in a live workout;
- Requesting user is always first in the list; and/or
- Trainer polls this endpoint every 5 s (or any other frequency, as appropriate) between sets during a live workout.

[POST]/live/{liveSessionId}/social-zone-activities

- Adds new social zone activity for a given user;
- Used by producer shoutouts console as shown for example in FIG. 15; and/or
- Shoutout model as request body (fields may include: userId, liveSessionId, type, shortDescription).

[GET]/live/{liveSessionId}/social-zone-summary

Returns personalized list of live participants ordered, for example, by: reactions given by requesting user, reactions received from requesting user, milestones, PRs, followings, then all other participants; and/or Excludes users who are not opted into the social feature or users who are blocked by the requesting user.

As described above, participants may assert a focus on other participants, for example by "following" another participant so that they may share one or more activities as the occur. Thus if Shinoh is following TamTams, and the coach cheers TamTams directly, Shinoh may be able to observe this cheer if the appropriate privacy settings for TamTams permits it.

As described above, participants may assert a defocus on other participants, for example by "blocking" another participant so that their activities are not observed. Thus if Shinoh blocks TamTams, then all related activities of TamTams would not appear on Shinoh's social zone, and it may seem to Shinoh as if TamTams does not exist.

Shoutouts/Social Zone Activity Type Definitions. Shoutout Categories. In one embodiment, there are two categories of shoutouts: Live and User. Live shoutouts are events that may happen during the live workout. With an exception of group shoutouts, these are automatically sent to the social zone of FIG. 13. They may be sent/mentioned by the coach through the console. User shoutouts are events specific to the user and any user data we have about them. These may not be sent automatically to the social zone and may need the console to be shown/mentioned.

Shoutout Priorities. In one embodiment, priorities are given to shoutouts and determine where they appear on the console and how long they persist visually in the social zone of FIG. 13.

| Priority | Time in Seconds |
|---|---|
| Low | 30 |
| Medium | 45 |
| High | 60 |
| Highest | 90 |

Shoutouts may also have a "None" priority which means it is the lowest (0) and may not appear in the social zone. This may apply to "Joined" and "TotalWorkoutVolume" shoutouts.

Console Facing Shoutout Types

In one embodiment, these are example shoutout types for the shoutout console (1402) of FIG. 14. Some of these types such as milestones may override backend types.

VolumeMilestone

Category: User
Priority: High/Highest*
How to earn:
- User has earned a volume milestone within the last seven days of joining live workout
- User hits volume milestone during live workout Notes:
- RecentAchievement and HighUpcomingMilestone may be converted into this type.
- *Priority depends on the value of the milestone.

StreakMilestone

Category: User
Priority: High/Highest*
How to earn:
- User has earned a streak milestone within the last seven days of joining live workout
- User hits streak milestone during live workout Notes:
- UpcomingAchievement, RecentAchievement and HighUpcomingMilestone may all be converted into this type.
- *Priority depends on the value of the milestone.

WorkoutMilestone

Priority: High/Highest*
How to earn:
- User has earned a workout milestone within the last seven days of joining live workout
- User hits workout milestone during live workout Notes:
- UpcomingAchievement, RecentAchievement and HighUpcomingMilestone may all be converted into this type.
- *Priority depends on the value of the milestone.

PR

Category: Live
Priority: Low
How to earn:
- User gets at least one PR in the last set

Anniversary

Category: User
Priority: Medium
How to earn:
- Date of user's first workout (or other event) was exactly one (or two, three, four, etc) year ago

Birthday

Category: User
Priority: Medium
How to earn:
- User's birthday is today

Joined

Category: User
Priority: None
How to earn:
- User joined workout

WorkoutCount

Category: User
Priority: High
How to earn:
- User's current total workout count (including the current live workout) is a multiple of 50 (100, 150, 200, etc)

Note:
- These may overlap with workout milestones.

TotalWorkoutVolume

Category: Live
Priority: None

How to earn:

User earns for every 5,000 lbs lifted in the workout (5 k, 10 k . . . )

Note:

These may not appear in the Social zone and may only be mentioned out loud by the coach.

GroupPR

Category: Live

Priority: Low

Each set may have up to three GroupPR shoutouts, one per PR type. There may one of each type as these are shared between all participants in the live workout.

How to trigger:

At least three users in the live workout earn the same type of PR (Strength, Power, Volume) in the last set At least 75% of the group complete the set before this shoutout is created, to reduce overloading the database table with duplicate shoutouts.

Note:

After each user finishes a set, on the backend individual shoutouts are checked as well as group shoutouts if the above conditions are met.

These may not appear in the social zone and may be mentioned out loud by the coach.

A query may retrieve group shoutouts even if the live is over/everyone has left.

GroupFormFeedback

Category: Live

Priority: Low

Each set may only have one of each form feedback trigger at most, to reduce duplicate shoutouts with the same form feedback message.

How to trigger:

At least three users in the live workout earn the same type of form feedback in the last set.

At least 75% of the group complete the set before this shoutout is created, to reduce overloading the database table with duplicate shoutouts.

Note:

After each user finishes a set, on the backend individual shoutouts are checked as well as group shoutouts if the above conditions are met.

These may not appear in the social zone and may be mentioned out loud by the coach.

A query may retrieve group shoutouts even if the live is over/everyone has left.

Backend Only Shoutout Types:

Backend only shoutout types do not necessarily show up on the console, and may be used for backend decisions to determine descriptions or priorities to assign.

UpcomingAchievement

Priority: default: High, but can be overridden to Highest depending on milestone value.

Backend applies a +1 logic to milestones when a user joins a live workout.

How to earn:

If it is predicted that a user may earn a Streak milestone or Workout milestone after this workout is complete, then a shoutout is created with this type. This type is used on the backend to apply the appropriate description to the shoutout.

Based on the milestone type (Streak, Workout), the UpcomingAchievement type is overridden with either StreakMilestone or WorkoutMilestone for the client to interpret and show the correct icon in the social zone.

This shoutout is created on the backend to reduce confusion wherein a coach would misinterpret the shoutout as if the user already had earned this at the beginning of the workout. Thus, prediction/estimation of e.g. volume for the user is performed but not shared with the studio/coach until the user actually hits the milestone during the workout.

RecentAchievement

Priority: default: High, but can be overridden to Highest depending on milestone value.

How to earn:

Any milestones that a user has earned within the last 7 days.

This type is used on the backend to apply the appropriate description to the shoutout.

Based on the milestone type (Volume, Streak, Workout), the RecentAchievement type is overridden with VolumeMilestone, StreakMilestone or WorkoutMilestone for the client to interpret and show the correct icon in the Social zone.

High ValueMilestone

Uses defined thresholds for a "High Value" milestone:

Volume: 1 million+lbs

Streak: 25+weeks

Workout: 100+workouts

This type is used on the backend to apply the appropriate priority to the shoutout, anything that meets the high value condition is assigned a higher priority.

Based on the milestone type (Volume, Streak, Workout), the High ValueMilestone type is overridden with VolumeMilestone, StreakMilestone or WorkoutMilestone for the client to interpret and show the correct icon in the Social zone.

Figure 17:
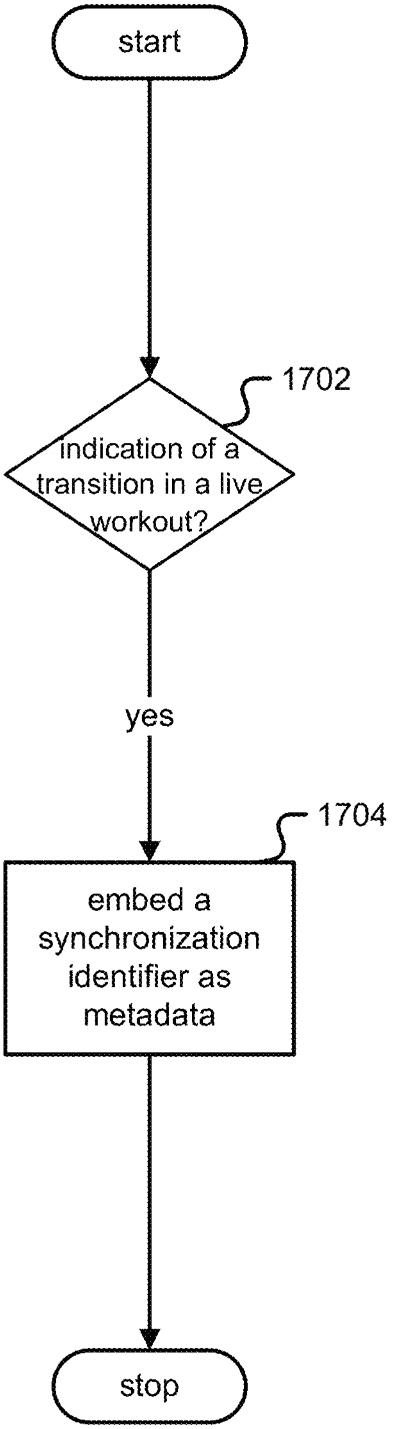
FIG. 17 is a flow diagram illustrating an embodiment of a process for synchronizing a state of a workout machine with a live workout, for example using a server.

FIG. 17 is a flow diagram illustrating an embodiment of a process for synchronizing a state of a workout machine with a live workout, for example using a server. In one embodiment, the process of FIG. 17 is carried out by studio console (908) in FIG. 9.

In step (1702), it is determined there is an indication of a transition in a live workout. In step (1704), in response to the indication of step (1702), a synchronization identifier as metadata is embedded in a portion of a video stream of the live workout. For example, workout features such as trainer state behavior are synchronized into the live stream using Amazon IVS "PutMetadata" facility to insert ID3 tags in video stream chunks.

In one embodiment, the portion of the video stream of the live workout is transmitted to a remote client exercise machine. In one embodiment, a hardware state of the remote client exercise machine is updated based at least in part on the synchronization identifier, at least in part to synchronize the remote client exercise machine with the live workout.

In one embodiment, the portion is a chunk of a video stream, and the synchronization identifier is a section group identifier. In one embodiment, the hardware state of the remote client exercise machine is updated based at least in part on an initial offset based on when a remote user joins the live workout. In one embodiment, the hardware state being updated includes a display change and/or a suggested weight.

In one embodiment, a hardware state being updated includes a suggested weight and the client exercise machine does not change to the suggested weight until the client exercise machine is safely quiescent. In one embodiment, the synchronization identifier is resent a plurality of times to enhance resilience/reliability, for example using a repetition code and/or channel coding.

In one embodiment, a web socket message from the client exercise machine is to be routed to a second client exercise machine. In one embodiment, embedding the synchronization identifier is delayed by an alignment delay based at least in part on a latency between a video stream and a live console. In one embodiment, the hardware state is updated with a fake weight based at least in part on a weight lifted in the live workout. In one embodiment, WebRTC is used in implementation to improve reliability.

Figure 18:
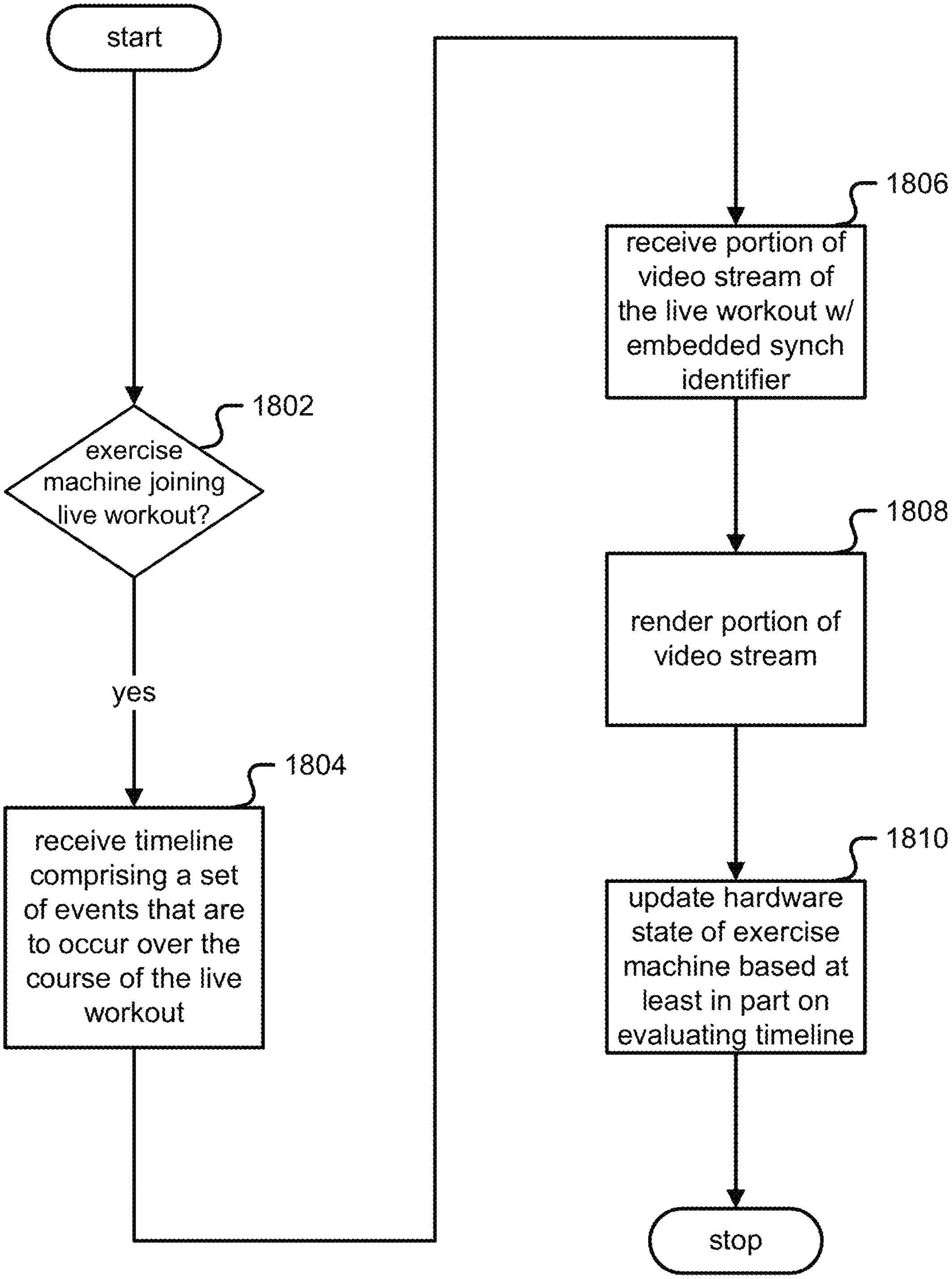
FIG. 18 is a flow diagram illustrating an embodiment of a process for synchronizing a state of a workout machine with a live workout, for example using a client.

FIG. 18 is a flow diagram illustrating an embodiment of a process for synchronizing a state of a workout machine with a live workout, for example using a client. In one embodiment, the process of FIG. 18 is carried out by strength trainers (902*a*), (902*b*), (902*c*), and/or (902*z*) in FIG. 9.

In step (1802), it is determined there is an exercise machine joining a video stream of a live workout. In step (1804), in response to the determination in step (1802), a timeline comprising a set of events that are to occur over the course of the live workout is received. In step (1806), a portion of the video stream of the live workout is received, wherein the portion of the video stream has embedded a synchronization identifier. In step (1808), the portion of the video stream is rendered. In step (1810), a hardware state of the exercise machine is updated at least in part by evaluating the timeline using the synchronization identifier embedded in the portion of the video stream, at least in part to synchronize the exercise machine with the live workout.

In one embodiment, the video stream of the live workout is an encore live workout from the past. In one embodiment, the encore live workout comprises addition of a timestamp to transition from a video streaming service to a content delivery network. In one embodiment, the addition of the timestamp includes an addition of an epoch and embedding the timestamp in an HTTP Live Streaming (HLS) uniform resource locator (URL).

Figure 19:
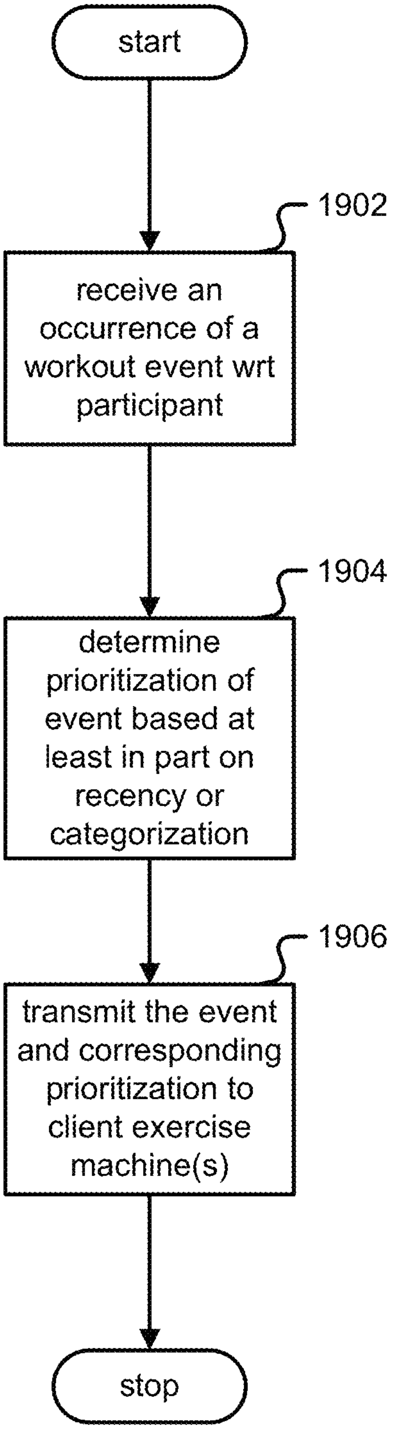
FIG. 19 is a flow diagram illustrating an embodiment of a process for communicating workout events to participants of a live workout.

FIG. 19 is a flow diagram illustrating an embodiment of a process for communicating workout events to participants of a live workout. In one embodiment, the process of FIG. 19 is carried out by the live service (1406), shoutouts console (1402), and/or coach dashboard (1408) of FIG. 14.

In step (1902), an occurrence of a workout event with respect to one or more participants of a live workout is received. In step (1904), a prioritization of the event is determined based at least in part on at least one of a recency of the event or a categorization of the event. In step (1906), the event and the corresponding prioritization to a client exercise machine is transmitted, wherein a position of a presentation of the event on a feed of events on the client exercise machine is based at least in part on the prioritization of the event.

In one embodiment, the workout event is a form feedback. In one embodiment, the prioritization is encoded as a timestamp. In one embodiment, the recency comprises when event occurred relative to current time. In one embodiment, a user-specific event is transmitted to a specific client exercise machine. In one embodiment, a user-wide event is transmitted to a plurality of client exercise machines, and wherein each of the plurality of client exercise machines merges events before an update.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

in response to an exercise machine joining a video stream of a live workout, receiving a timeline comprising a set of events that are to occur over a course of the live workout, wherein the timeline is loaded on the exercise machine;

receiving a portion of the video stream of the live workout, wherein the portion of the video stream has embedded a synchronization identifier;

rendering the portion of the video stream; and facilitating synchronizing of the exercise machine with the live workout at least in part by updating a hardware state of the exercise machine, wherein the updating of the hardware state of the exercise machine comprises determining a set of state changes to execute at least in part by using the synchronization identifier embedded in the portion of the video stream as an index into the timeline loaded on the exercise machine, wherein the hardware state of the exercise machine that is updated includes a suggested amount of resistance that is provided by a motor of the exercise machine against a user via a cable routed through an arm of the exercise machine.

2. The method of claim 1, wherein the video stream of the live workout comprises an encore live workout from the past.

3. The method of claim 2, wherein the encore live workout comprises addition of a timestamp to transition from a video streaming service to a content delivery network.

4. The method of claim 1, wherein the portion comprises a chunk of the video stream, and the synchronization identifier comprises a section group identifier.

5. The method of claim 1, wherein updating the hardware state of the exercise machine is based at least in part on an initial offset based on when the exercise machine joins the video stream of the live workout.

6. The method of claim 1, wherein updating the hardware state of the exercise machine includes a display change.

7. The method of claim 1, wherein the synchronization identifier is resent a plurality of times to enhance reliability.

8. The method of claim 1, further comprising transmitting a web socket message to be routed to a client exercise machine.

9. The method of claim 1, wherein the synchronization identifier is delayed by an alignment delay based at least in part on a latency between the video stream and a live console.

10. A system, comprising:

a communication interface; and a processor coupled to the communication interface, configured to:

in response to an exercise machine joining a video stream of a live workout, receive a timeline comprising a set of events that are to occur over a course of the live workout, wherein the timeline is loaded on the exercise machine;

receive a portion of the video stream of the live workout, wherein the portion of the video stream has embedded a synchronization identifier;

render the portion of the video stream; and facilitate synchronizing of the exercise machine with the live workout at least in part by updating a hardware state of the exercise machine, wherein the updating of the hardware state of the exercise machine comprises determining a set of state changes to execute at least in part by using the synchronization identifier embedded in the portion of the video stream as an index into the timeline loaded on the exercise machine, wherein the hardware state of the exercise machine that is updated includes a suggested amount of resistance that is provided by a motor of the exercise machine against a user via a cable routed through an arm of the exercise machine.

11. The system of claim 10, wherein the video stream of the live workout comprises an encore live workout from the past.

12. The system of claim 11, wherein the encore live workout comprises addition of a timestamp to transition from a video streaming service to a content delivery network.

13. A computer program product embodied in a non-transitory computer readable medium and comprising computer instructions for:

in response to an exercise machine joining a video stream of a live workout, receiving a timeline comprising a set of events that are to occur over a course of the live workout, wherein the timeline is loaded on the exercise machine;

receiving a portion of the video stream of the live workout, wherein the portion of the video stream has embedded a synchronization identifier;

rendering the portion of the video stream; and facilitating synchronizing of the exercise machine with the live workout at least in part by updating a hardware state of the exercise machine, wherein the updating of the hardware state of the exercise machine comprises determining a set of state changes to execute at least in part by using the synchronization identifier embedded in the portion of the video stream as an index into the timeline loaded on the exercise machine, wherein the hardware state of the exercise machine that is updated includes a suggested amount of resistance that is provided by a motor of the exercise machine against a user via a cable routed through an arm of the exercise machine.

14. The computer program product of claim 13, wherein the video stream of the live workout comprises an encore live workout from the past.

15. The computer program product of claim 14, wherein the encore live workout comprises addition of a timestamp to transition from a video streaming service to a content delivery network.

* * * * *